United States Patent
Gao et al.

(10) Patent No.: US 11,149,129 B2
(45) Date of Patent: Oct. 19, 2021

(54) GRAPHENE COMPOSITE MATERIAL AND PREPARATION METHOD THEREOF

(71) Applicant: HANGZHOU GAOXI TECHNOLOGY CO., LTD., Hangzhou (CN)

(72) Inventors: Chao Gao, Hangzhou (CN); Chen Chen, Hangzhou (CN); Yi Han, Hangzhou (CN)

(73) Assignee: HANGZHOU GAOXI TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/626,546

(22) PCT Filed: Feb. 26, 2018

(86) PCT No.: PCT/CN2018/077169
§ 371 (c)(1),
(2) Date: Dec. 25, 2019

(87) PCT Pub. No.: WO2019/000985
PCT Pub. Date: Jan. 3, 2019

(65) Prior Publication Data
US 2020/0247974 A1 Aug. 6, 2020

(30) Foreign Application Priority Data

| Jun. 26, 2017 | (CN) | 201710494271.0 |
| Jun. 26, 2017 | (CN) | 201710494462.7 |
| Jun. 26, 2017 | (CN) | 201710494501.3 |
| Jun. 26, 2017 | (CN) | 201710495004.5 |
| Jun. 26, 2017 | (CN) | 201710495017.2 |
| Jun. 26, 2017 | (CN) | 201710495022.3 |
| Jun. 26, 2017 | (CN) | 201710497221.8 |
| Aug. 21, 2017 | (CN) | 201710718364.7 |
| Aug. 21, 2017 | (CN) | 201710718369.X |

(51) Int. Cl.
*C08K 3/04* (2006.01)
*C08G 63/183* (2006.01)
*C08G 69/16* (2006.01)
*D01F 8/14* (2006.01)
*D01F 8/18* (2006.01)

(52) U.S. Cl.
CPC ............ *C08K 3/042* (2017.05); *C08G 63/183* (2013.01); *C08G 69/16* (2013.01); *D01F 8/14* (2013.01); *D01F 8/18* (2013.01)

(58) Field of Classification Search
CPC ...... C08K 3/042; C08G 63/183; C08G 69/16; D01F 8/18; D01F 8/14
See application file for complete search history.

(56) References Cited

U.S. PATENT DOCUMENTS

2014/0080962 A1 3/2014 Hanan
2017/0058433 A1* 3/2017 Egan .................... D01F 8/00

FOREIGN PATENT DOCUMENTS

| CN | 103087404 A | 5/2013 |
| CN | 104817746 A | 8/2015 |
| CN | 105017511 A | 11/2015 |
| CN | 105200547 A | 12/2015 |
| CN | 105525381 A | 4/2016 |
| CN | 105540573 A | 5/2016 |
| CN | 105820519 A | 8/2016 |
| CN | 106832261 A | 6/2017 |
| CN | 106868693 A | 6/2017 |
| CN | 106884219 A | 6/2017 |
| CN | 107057058 A | 8/2017 |

OTHER PUBLICATIONS

International Search Report issued in corresponding International application No. PCT/CN2018/077169, dated May 4, 2018.
Written Opinion of the International Searching Authority for No. PCT/CN2018/077169.

* cited by examiner

*Primary Examiner* — Robert D Harlan

(57) ABSTRACT

The present invention discloses a graphene composite material and a preparation method thereof. By adding pleated graphene oxide microspheres and a catalyst to a precursor, the pleated graphene oxide microspheres are allowed to be highly dispersed and gradually disassociated into single-layer graphene oxide sheets during the process of polycondensation, the partially esterified molecules react with the hydroxyl and carboxyl group on the surface of graphene oxide sheets to form a chemical bond, and the graphene oxide is thermally reduced, to finally obtain a composite material comprising PET and graphene sheets having PET grated to the surface.

6 Claims, 3 Drawing Sheets

GRAPHENE COMPOSITE MATERIAL AND PREPARATION METHOD THEREOF

TECHNICAL FIELD

The present invention relates to the technical field of composite materials, and particularly to a graphene composite material, including a graphene/PET nanocomposite material, a graphene/polyester composite fiber for a cord, a graphene/polyester composite fabric, a graphene/PET composite film, a graphene/PET composite board, a graphene modified polyester blended fabric, and a graphene modified flame-retardant and UV-resistant polyester fiber; and a preparation method thereof.

BACKGROUND

Polyethylene terephthalate (PET) is a very important polymer material, which is present in a quite large proportion in people's daily life, such as disposable water bottles, packaging materials, and automotive plastics, etc. PET can be spun to get polyester commonly used in clothing, so PET is widely present in our lives. If the performance of PET can be further improved or new properties can be imparted to PET, it will not only further widen the scope of the use of PET, but also bring more convenience to human society. In recent years, researchers have improved the properties of PET by regulating the molecular structure of PET, conducting copolymerization reactions, introducing a reinforcing phase for compounding, designing micromorphologies such as sea-islands, and controlling the crystallization behavior, and have achieved remarkable results.

Polyester is an important type of synthetic fiber. It is a fiber made from polyethylene terephthalate (PET) after spinning and post-treatment. Because of its stable chemical property, high mechanical strength, light weight, good thermal stability, good hygienic performance, high transparency, and easy processing, polyester is widely used in textile products such as clothing, bedding, various decorative fabrics, and special fabrics for national defense and military industry, and other industrial fiber products. PET industrial yarns are widely used in automobile tires because of their low cost and high strength. In order to further enhance the strength of PET industrial yarns, various means of improvement are employed. In Patent No. 201310043077.2 entitled "Production method of melt-spun high-modulus low-shrinkage polyester industrial filament", a high-modulus low-shrinkage polyester filament is obtained by means of liquid phase viscosity increasing and direct spinning of the melt, and two-stage drawing, which can be used in a cord or other areas. In addition to improving the spinning process, the strength of the filament can be increased by adding a reinforcing material to obtain a better performance.

The introduction of reinforcing materials is a fast and cost-effective method. Conventional reinforcing materials include metal materials (e.g. nanowires, and nanoparticles), inorganic fillers (e.g. montmorillonite, titania, silica, and boron nitride, etc.) and carbon materials (e.g. carbon black, graphite, etc.). There are two major drawbacks to conventional reinforcing materials. On the one hand, a high dosage is required to achieve a satisfactory result, but the high dosage is accompanied by declines in other properties, making it difficult to achieve a comprehensive improvement in the performances. On the other hand, the reinforcing effect is often simple, and it is impossible to improve multiple performances at the same time. These problems lead to low cost performance of the conventional reinforcing materials, so they are unsatisfactory. For spinning, the impact of dispersion uniformity on the spinning continuity needs to be taken into account when the reinforcing material is filled. Otherwise broken filaments and floating yarns are very likely to occur, which is not conducive to continuous production.

Graphene is a two-dimensional material with atomic thickness. It has an extremely high specific surface area, excellent mechanical properties, high electrical conductivity, high thermal conductivity, and high barrier property. In addition, adding a small amount of graphene can improve many properties of the material at the same time, which allows graphene to have an extremely high cost performance, and makes it widely studied in composite materials. However, graphene tends to aggregate, and form a stacked structure of graphite again, reducing the reinforcing effect. Although addition of a dispersant or surface modification can be carried out to promote the dispersion and reduce the stacking of graphene, these methods increase the cost of graphene and introduce new ingredients. In Patent No. 201510514154.7 entitled "Preparation method of graphene oxide modified PET material", graphene oxide is added to give a graphene oxide aqueous solution before esterification. On the one hand, the addition of water has influence on the esterification and polycondensation; and on the other hand, graphene oxide is reduced in the esterification stage, which may cause stacking and reduce the performance. In Patent No. 201280033203.X entitled "Polyethylene terephthalate-graphene nanocomposite", graphene nanosheets are added to a PET polymerization system. Multi-layer graphene causes a high dosage (2-15%), and because there is no functional group, graphene will undergo secondary stacking during the polymerization process, forming incompatible defect points. In Patent No. 201610111707.9 entitled "PET-based graphene composite material, preparation method thereof and aerostat", graphene oxide is modified with ethylene glycol, then esterified or transesterified with the PET monomer, and finally polycondensed to obtain a composite material. Although the modification improves the compatibility of graphene with the PET polymerization system and allows for the covalent grafting of graphene and PET, stacking of graphene oxide still inevitably occurs during the esterification process; and the preparation process is complicated, and the overall production cost is high, so the method is not suitable for actual production.

For continuous spinning, the strong aggregation of graphene will result in defects in the fibers, causing increased breakage and lousiness of filaments in the spinning process. Therefore, many researchers have tried to suppress the stacking of graphene, for example, by polymerization with graphene oxide, surface modification or adding a dispersant. In Patent No. 201510680473.5 entitled "Method for preparing graphene-polyester nanocomposite fibers", a graphene powder and PET are melted, blended, extruded, granulated, and then spun. However, the conventional graphene powder is formed of multiple-layer stacked graphene, and such a stack cannot be separated by the mixing effect of extrusion through the screw, which seriously affects the spinnability and continuity. In Patent No. 201510688803.5 entitled "Method for preparing military anti-dripping antistatic high-strength flame-retardant polyester", graphene oxide is modified and dried, and then blended with PET, granulated and spun. Although the aggregation is effectively reduced by modification of graphene oxide, the aggregate of graphene in the modified powder after drying cannot be dissociated in the process of melt extrusion, causing plugging of the spinneret and broken filaments. In Patent No.

201610757032.5 entitled "Graphene-polyester single filament", graphene is treated with a silane coupling agent, and then blended and extruded with PET. The coupling agent can improve the interaction between graphene and PET, but cannot change the state of stacking of graphene, so the spinning effect is still not good. In summary, the current preparation of graphene-based polyester fibers cannot fundamentally solve the problem of graphene stacking, thus greatly limiting the high-speed, continuous spinning.

In addition, the methods reported so far for the in-situ polymerization of a graphene oxide dispersion with caprolactam to prepare a graphene/nylon 6 composite material are based on a batch reactor process, and a large amount of water is present in the polymerization system. In the industry, most of the production lines of nylon 6 use VK tubes for continuous polymerization, and raise a high requirement for the water content in the polymerization system. High water content seriously inhibits the increase of the molecular weight and even makes it difficult to polymerize, which is extremely disadvantageous for the large-scale preparation of graphene/nylon 6. Therefore, there is a need for graphene oxide powder that can be dispersed in a polymerization system to prepare a composite material.

SUMMARY

In view of the disadvantages existing in the prior art, an object of the present invention is to provide a graphene composite material, including a graphene/PET nanocomposite material, a graphene/polyester composite fiber for cords, a graphene/polyester composite fabric, a graphene/PET composite film, a graphene/PET composite board, a graphene modified polyester blended fabric, and a graphene modified flame-retardant and UV-resistant polyester fiber; and a preparation method thereof.

The following technical solutions are adopted in the present invention.

Solution I:

A graphene/PET nanocomposite material comprises single-layer graphene sheets and PET, in which the surface of the graphene sheet and the PET molecule are connected by a covalent bond.

A method for preparing a graphene/PET nanocomposite material comprises the following steps:

(1) drying a dispersion of single-layer graphene oxide with a size of 1-50 μm by atomization drying to obtain pleated graphene oxide microspheres having a carbon/oxygen ratio of 2.5-5;

(2) fully mixing 100 parts by weight of terephthalic acid, 48-67 parts by weight of ethylene glycol, and 002 g of sodium acetate by stirring, and subjecting the mixture to an esterification reaction at 250° C.; and (3) adding 0.0117-5.85 parts by weight of the pleated graphene oxide microspheres obtained in Step (1) and 0.018 part by weight of a catalyst to the esterification product obtained in Step (2), incubating with stirring for 1-3 hrs, heating to 285° C. and evacuating to allow the reaction to proceed until no heat is released from the system, and then granulating with water cooling to obtain a graphene/PET nanocomposite material.

Further, the atomization drying temperature in Step (1) is 130 to 200° C. The stirring speed in Step (3) is 140-200 rpm. The catalyst in Step (3) is an antimony-based catalyst, including an oxide, an inorganic salt, and an organic compound of antimony. The catalyst in Step (3) is a titanium-based catalyst, including an oxide, an inorganic salt, and an organic compound of titanium. The catalyst in Step (3) is a germanium-based catalyst, including an oxide, an inorganic salt, and an organic compound of germanium.

The beneficial effects are as follows. In the present invention, pleated graphene oxide microspheres are first obtained by atomization drying. By sound choice of the carbon/oxygen ratio in and the size of graphene oxide, the pleated graphene oxide microspheres are allowed to gradually unfold and disassociate into flake-like graphene oxide in the PET oligomer after esterification. During the polymerization of PET, the hydroxyl group and carboxyl group on the surface of graphene oxide react with the PET molecules in the system, so that the PET molecules are grafted to the surface of graphene. This improves the compatibility therebetween, and contributes to the improvement of the mechanical properties and the electrical conductivity. By adding graphene oxide after esterification, the impact on the esterification process is avoided, whereby the method is more reasonable and efficient, and has lower cost in practical production process, and also prevents the graphene oxide from stacking to form an aggregate during the esterification stage. Throughout the whole polymerization process of PET, no other materials are introduced except for the pleated graphene oxide microspheres; and terephthalic acid, ethylene glycol, the esterification catalyst and the polycondensation catalyst are all used in an amount that is the same as that in a simple polymerization process of PET, which minimizes the impact of the introduction of graphene on the process and equipment Thus the present invention has a broad prospect of application. The obtained graphene/PET composite material has excellent mechanical properties and electrical conductivity, and can be used in the production of functionalized polyester fibers.

Solution II:

A graphene/polyester composite fiber for a cord is provided, which is obtained from a graphene/PET nanocomposite material by drying, pre-crystallization, solid-phase polycondensation, cooling, and high-speed melt spinning. The graphene/PET nanocomposite material comprises single-layer graphene sheets and PET, in which the surface of the graphene sheet and the PET molecule are connected by a covalent bond. The drying temperature is 170 to 180° C., the pre-crystallization temperature is 175 to 185° C., the solid-phase polycondensation temperature is 210 to 220° C., the intrinsic viscosity after the solid-phase polycondensation is 0.9 to 1.2, the cooling temperature is 60 to 80° C., the spinning temperature is 270 to 290° C., the winding speed is 3000 to 5000 m/min, and the draw ratio is 1.5 to 4.

Further, the graphene/PET nanocomposite material is prepared through a process comprising the following steps:

(1) drying a dispersion of single-layer graphene oxide with a size of 1-10 μm by atomization drying to obtain pleated graphene oxide microspheres having a carbon/oxygen ratio of 2.5-5;

(2) fully mixing 100 parts by weight of terephthalic acid, 48-67 parts by weight of ethylene glycol, and 0.02 part by weight of sodium acetate by stirring, and subjecting the mixture to an esterification reaction at 250° C.; and (3) adding 0.117-1.17 parts by weight of the pleated graphene oxide microspheres obtained in Step (1) and 0.018 part by weight of a catalyst to the esterification product obtained in Step (2), incubating with stirring for 1-3 hrs, heating to 285° C. and evacuating to allow the reaction to proceed until no heat is released from the system, and then granulating with water cooling to obtain a graphene/PET nanocomposite material.

Further, the atomization drying temperature in Step (1) is 130 to 200° C. The stirring speed in Step (3) is 140-200 rpm.

The catalyst in Step (3) is an antimony-based catalyst, including an oxide, an inorganic salt, and an organic compound of antimony. The catalyst in Step (3) is a titanium-based catalyst, including an oxide, an inorganic salt, and an organic compound of titanium. The catalyst in Step (3) is a germanium-based catalyst, including an oxide, an inorganic salt, and an organic compound of germanium.

The beneficial effects are as follows. (1) The pleated graphene oxide microspheres added after esterification can gradually unfold and disassociate into single-layer flake-like graphene oxide. During the polymerization of PET, the hydroxyl group and carboxyl group on the surface of graphene oxide react with the PET molecules in the system, so that the PET molecules are grafted to the surface of graphene. This improves the compatibility therebetween, and greatly reduces the amount of graphene added while reducing the stacking, so that the method of the present invention has high cost performance. In contrast, the addition of graphene oxide in the esterification stage will cause thermal reduction of graphene oxide. As the reaction proceeds, the graphene produced after reduction will be gradually stacked into an aggregate, which is not conducive to the improvement of performance, and causes failure in continuous high-speed spinning due to the presence of the aggregate. (2) By adding graphene oxide after esterification, the impact on the esterification process is avoided. For the polymerization process, the introduction of pleated graphene oxide microspheres has no obvious impact on the polymerization process, so the method of the present invention is more reasonable and efficient, and has lower cost in practical production. (3) Graphene can increase the viscosity of the PET melt. By selecting appropriate carbon/oxygen ratio in, and size and filling amount of graphene oxide, the viscosity of the melt can be controlled within a suitable range. (4) After the graphene is added, the composite material can be continuously spun at a high speed, and the resulting fiber has high breaking strength and elongation at break, and improved heat resistance.

Solution III:

A multi-functional graphene/polyester composite fabric is provided, which is obtained by mixing 100 parts by weight of graphene/PET nanocomposite material and 0-10 parts by weight of an auxiliary agent, and spinning, cooling, oiling, drawing, texturing, weaving, dyeing, and finishing. The graphene/PET nanocomposite material comprises single-layer graphene sheets and PET, in which the surface of the graphene sheet and the PET molecule are connected by a covalent bond.

Further, the graphene/PET nanocomposite material is prepared through a process comprising the following steps:

(1) drying a dispersion of single-layer graphene oxide with a size of 1-50 μm by atomization drying to obtain pleated graphene oxide microspheres having a carbon/oxygen ratio of 2.5-5;

(2) fully mixing 100 parts by weight of terephthalic acid, 48-67 parts by weight of ethylene glycol, and 0.02 part by weight of sodium acetate by stirring, and subjecting the mixture to an esterification reaction at 250° C.; and (3) adding 0.585-5.85 parts by weight of the pleated graphene oxide microspheres obtained in Step (1) and 0.018 part by weight of a catalyst to the esterification product obtained in Step (2), incubating with stirring for 1-3 hrs, heating to 285° C. and evacuating to allow the reaction to proceed until no heat is released from the system, and then granulating with water cooling to obtain a graphene/PET nanocomposite material.

Further, the atomization drying temperature in Step (1) is 130 to 200° C. The stirring speed in Step (3) is 140-200 rpm. The catalyst in Step (3) is an antimony-based catalyst, including an oxide, an inorganic salt, and an organic compound of antimony. The catalyst in Step (3) is a titanium-based catalyst, including an oxide, an inorganic salt, and an organic compound of titanium. The catalyst in Step (3) is a germanium-based catalyst, including an oxide, an inorganic salt, and an organic compound of germanium.

The auxiliary agent is composed of one or more of an antioxidant, an inorganic filler, a toughening agent, and a gloss improving agent in any proportion.

The spinning temperature is 270 to 290° C., the winding speed is 3000-5000 m/min, and the draw ratio is 1.5-4. The obtained fiber has a Denier number of 30 to 600D. The weaving method is to weave using a loom with or without a shuttle.

The beneficial effects are as follows. (1) The pleated graphene oxide microspheres added after esterification can gradually unfold and disassociate into single-layer flake-like graphene oxide. During the polymerization of PET, the hydroxyl group and carboxyl group on the surface of graphene oxide react with the PET molecules in the system, so that the PET molecules are grafted to the surface of graphene. This improves the compatibility therebetween, and greatly reduces the amount of graphene added while reducing the stacking, so that the method of the present invention has high cost performance. In contrast, the addition of graphene oxide in the esterification stage will cause thermal reduction of graphene oxide. As the reaction proceeds, the graphene produced after reduction will be gradually stacked into an aggregate, which is not conducive to the improvement of performance, and causes failure in continuous high-speed spinning due to the presence of the aggregate. (2) By adding graphene oxide after esterification, the impact on the esterification process is avoided. For the polymerization process, the introduction of pleated graphene oxide microspheres has no obvious impact on the polymerization process, so the method of the present invention is more reasonable and efficient, and has lower cost in practical production. (3) After adding graphene, the composite material is subjected to high-speed continuous spinning, and the fabric obtained by weaving the fiber has good UV resistance and flame retardancy. Increasing the amount of graphene can significantly improve the electrical conductivity of the fabric. Therefore, the fabric obtained can be used as an antistatic fabric. (4) The fabric has good durability and can maintain high performance after repeated washing, exposure to the sun and rubbing. (5) The fabric can be reused, the spent cloth can be recycled, and the UV resistance and flame retardancy can be recovered.

Solution IV:

A graphene/PET composite film is provided, which is obtained by co-melting and casting 100 parts by weight of a graphene/PET nanocomposite material and 0-10 parts by weight of an auxiliary agent into a film. The graphene/PET nanocomposite material comprises single-layer graphene sheets and PET, in which the surface of the graphene sheet and the PET molecule are connected by a covalent bond.

A method for preparing a graphene/PET composite film comprises uniformly mixing 100 parts by weight of a graphene/PET nanocomposite material and 0-10 parts by weight of an auxiliary agent, melting, and casting into a film, to obtain the multi-functional graphene/PET composite film of the present invention. The auxiliary agent is composed of one or more of an antioxidant, an inorganic filler, a toughening agent, and a gloss improving agent in any proportion.

The temperature for melting and casting into a film is 250-280° C., the rotational speed of the screw is 40-300 rpm, and the drawing velocity is 1-50 m/min.

Further, the graphene/PET nanocomposite material is prepared through a process comprising the following steps:

(1) drying a dispersion of single-layer graphene oxide with a size of 1-50 μm by atomization drying to obtain pleated graphene oxide microspheres having a carbon/oxygen ratio of 2.5-5;

(2) fully mixing 100 parts by weight of terephthalic acid, 48-67 parts by weight of ethylene glycol, and 0.02 part by weight of sodium acetate by stirring, and subjecting the mixture to an esterification reaction at 250° C.; and (3) adding 0.0117-5.85 parts by weight of the pleated graphene oxide microspheres obtained in Step (1) and 0.018 part by weight of a catalyst to the esterification product obtained in Step (2), incubating with stirring for 1-3 hrs, heating to 285° C. and evacuating to allow the reaction to proceed until no heat is released from the system, and then granulating with water cooling to obtain a graphene/PET nanocomposite material.

Further, the atomization drying temperature in Step (1) is 130 to 200° C. The stirring speed in Step (3) is 140-200 rpm. The catalyst in Step (3) is an antimony-based catalyst, including an oxide, an inorganic salt, and an organic compound of antimony. The catalyst in Step (3) is a titanium-based catalyst, including an oxide, an inorganic salt, and an organic compound of titanium. The catalyst in Step (3) is a germanium-based catalyst, including an oxide, an inorganic salt, and an organic compound of germanium.

The beneficial effects are as follows. (1) The pleated graphene oxide microspheres added after esterification can gradually unfold and disassociate into single-layer flake-like graphene oxide. During the polymerization of PET, the hydroxyl group and carboxyl group on the surface of graphene oxide react with the PET molecules in the system, so that the PET molecules are grafted to the surface of graphene. This improves the compatibility therebetween, and greatly reduces the amount of graphene added while reducing the stacking, so that the method of the present invention has high cost performance. In contrast, the addition of graphene oxide in the esterification stage will cause thermal reduction of graphene oxide. As the reaction proceeds, the graphene produced after reduction will be gradually stacked into an aggregate, which is not conducive to the improvement of performance, and causes great impact on the uniformity and formability of the material. (2) By adding graphene oxide after esterification, the impact on the esterification process is avoided. For the polymerization process, the introduction of pleated graphene oxide microspheres has no obvious impact on the polymerization process, so the method of the present invention is more reasonable and efficient, and has lower cost in practical production. (3) After adding graphene, the composite film has significantly improved oxygen and water permeability and UV resistance, and can be used as a protective material and a packaging material. (4) At a high dosage, the composite film has a significantly increased electrical conductivity, and can be used as an antistatic material.

Solution V:

A high-strength dripping resistant graphene/PET composite board is provided, which is obtained by co-melting and extruding 100 parts by weight of a graphene/PET nanocomposite material and 0-10 parts by weight of an auxiliary agent. The graphene/PET nanocomposite material comprises single-layer graphene sheets and PET, in which the surface of the graphene sheet and the PET molecule are connected by a covalent bond.

A method for preparing a graphene/PET composite board comprises uniformly mixing 100 parts by weight of a graphene/PET nanocomposite material and 0-10 parts by weight of an auxiliary agent, melting, and extruding, to obtain the high-temperature resistant anti-dripping graphene/PET composite board of the present invention. The auxiliary agent is composed of one or more of an antioxidant, an inorganic filler, a toughening agent, and a gloss improving agent in any proportion. The temperature for melting and extruding is 230-260° C., the rotational speed of the screw is 30-90 rpm, and the drawing velocity is 0.15-6 m/min.

Further, the graphene/PET nanocomposite material is prepared through a process comprising the following steps:

(1) drying a dispersion of single-layer graphene oxide with a size of 1-50 μm by atomization drying to obtain pleated graphene oxide microspheres having a carbon/oxygen ratio of 2.5-5;

(2) fully mixing 100 parts by weight of terephthalic acid, 48-67 parts by weight of ethylene glycol, and 0.02 part by weight of sodium acetate by stirring, and subjecting the mixture to an esterification reaction at 250° C.; and (3) adding 0.0117-5.85 parts by weight of the pleated graphene oxide microspheres obtained in Step (1) and 0.018 part by weight of a catalyst to the esterification product obtained in Step (2), incubating with stirring for 1-3 hrs, heating to 285° C. and evacuating to allow the reaction to proceed until no heat is released from the system, and then granulating with water cooling to obtain a graphene/PET nanocomposite material.

Further, the atomization drying temperature in Step (1) is 130 to 200° C. The stirring speed in Step (3) is 140-200 rpm. The catalyst in Step (3) is an antimony-based catalyst, including an oxide, an inorganic salt, and an organic compound of antimony. The catalyst in Step (3) is a titanium-based catalyst, including an oxide, an inorganic salt, and an organic compound of titanium. The catalyst in Step (3) is a germanium-based catalyst, including an oxide, an inorganic salt, and an organic compound of germanium.

The beneficial effects are as follows. (1) A small amount of pleated graphene oxide microspheres is added for in-situ polymerization with the PET precursor, by which the yield strength and the elastic modulus of the PET board is significantly improved, and the yield strength at high temperatures is also improved. This is because the pleated graphene oxide microspheres added after esterification can gradually unfold and disassociate into flake-like graphene oxide. During the polymerization of PET, the hydroxyl group and carboxyl group on the surface of graphene oxide react with the PET molecules in the system, so that the PET molecules are grafted to the surface of graphene. This improves the compatibility therebetween. The lower level of stacking greatly reduces the amount of graphene added, making the method of the present invention highly cost-effective. (2) By adding graphene oxide after esterification, the impact on the esterification process is avoided. For the polymerization process, the introduction of graphene oxide has no obvious impact on the polymerization process, so the method of the present invention is more reasonable and efficient, and has lower cost in practical production. (3) The addition of graphene reduces the dripping speed of the board during burning and improves the resistance to dripping of the material. (4) At a high amount of graphene oxide, the composite board has a significantly increased electrical conductivity, and can be used as an antistatic material.

Solution VI:

A graphene modified polyester blended fabric is provided, which is obtained by blending 40-60 parts by weight of cotton fibers, 30-50 parts by weight of graphene/PET composite fibers, and 10-20 parts by weight of other fibers. The graphene/PET composite fiber is obtained by mixing a graphene/PET nanocomposite material and 0-10 parts by weight of an auxiliary agent, followed by high-speed melt spinning, cooling, oiling, drawing, and texturing. The graphene/PET nanocomposite material comprises single-layer graphene sheets and PET, in which the surface of the graphene sheet and the PET molecule are connected by a covalent bond.

Further, the graphene/PET nanocomposite material is prepared through a process comprising the following steps:

(1) drying a dispersion of single-layer graphene oxide with a size of 1-50 μm by atomization drying to obtain pleated graphene oxide microspheres having a carbon/oxygen ratio of 2.5-5;

(2) fully mixing 100 parts by weight of terephthalic acid, 48-67 parts by weight of ethylene glycol, and 0.02 part by weight of sodium acetate by stirring, and subjecting the mixture to an esterification reaction at 250° C.; and (3) adding 0.117-5.85 parts by weight of the pleated graphene oxide microspheres obtained in Step (1) and 0.018 part by weight of a catalyst to the esterification product obtained in Step (2), incubating with stirring for 1-3 hrs, heating to 285° C. and evacuating to allow the reaction to proceed until no heat is released from the system, and then granulating with water cooling to obtain a graphene/PET nanocomposite material.

Further, the atomization drying temperature in Step (1) is 130 to 200° C. The stirring speed in Step (3) is 140-200 rpm. The catalyst in Step (3) is an antimony-based catalyst, including an oxide, an inorganic salt, and an organic compound of antimony. The catalyst in Step (3) is a titanium-based catalyst, including an oxide, an inorganic salt, and an organic compound of titanium. The catalyst in Step (3) is a germanium-based catalyst, including an oxide, an inorganic salt, and an organic compound of germanium.

The auxiliary agent is composed of one or more of an antioxidant, an inorganic filler, a toughening agent, and a gloss improving agent in any proportion.

The spinning temperature is 270 to 290° C., the winding speed is 3000-5000 m/min, and the draw ratio is 1.5-4. The obtained fiber has a Denier number of 30 to 400D.

The beneficial effects are as follows. (1) The pleated graphene oxide microspheres added after esterification can gradually unfold and disassociate into single-layer flake-like graphene oxide. During the polymerization of PET, the hydroxyl group and carboxyl group on the surface of graphene oxide react with the PET molecules in the system, so that the PET molecules are grafted to the surface of graphene. This improves the compatibility therebetween, and greatly reduces the amount of graphene added while reducing the stacking, so that the method of the present invention has high cost performance. In contrast, the addition of graphene oxide in the esterification stage will cause thermal reduction of graphene oxide. As the reaction proceeds, the graphene produced after reduction will be gradually stacked into an aggregate, which is not conducive to the improvement of performance, and causes failure in continuous high-speed spinning due to the presence of the aggregate. (2) By adding graphene oxide after esterification, the impact on the esterification process is avoided. For the polymerization process, the introduction of pleated graphene oxide microspheres has no obvious impact on the polymerization process, so the method of the present invention is more reasonable and efficient, and has lower cost in practical production. (3) After adding graphene, the composite material can be continuously spun at a high speed, and can be blended with traditional natural fabrics (cotton, linen, and wool) and synthetic fabrics (nylon, spandex, and aramid), etc., which retains the properties such as comfortability, water resistance, water absorptivity, and breathability of the original fabrics, and allows the blended fabric to have good UV resistance and flame retardancy by taking advantage of the characteristics of graphene. (4) The fabric has good durability and can maintain high performance after repeated washing, exposure to the sun and rubbing. (5) The fabric can be reused, the spent cloth can be recycled, and the UV resistance and flame retardancy can be recovered.

Solution VII:

A graphene-modified flame-retardant and ultraviolet-resistant polyester fiber is provided, which is obtained by mixing 100 parts by weight of a graphene/PET nanocomposite material and 0-10 parts by weight of an auxiliary agent, followed by spinning, cooling, oiling, drawing, and winding. The graphene/PET nanocomposite material comprises single-layer graphene sheets and PET, in which the surface of the graphene sheet and the PET molecule are connected by a covalent bond.

A method for preparing a graphene-modified flame-retardant and ultraviolet-resistant polyester fiber comprises uniformly mixing 100 parts by weight of a graphene/PET nanocomposite material and 0-10 parts by weight of an auxiliary agent, followed by spinning, cooling, oiling, drawing, and winding. The graphene/PET nanocomposite material comprises single-layer graphene sheets and PET, in which the surface of the graphene sheet and the PET molecule are connected by a covalent bond.

Further, the graphene/PET nanocomposite material is prepared through a process comprising the following steps:

(1) drying a dispersion of single-layer graphene oxide with a size of 1-50 μm by atomization drying to obtain pleated graphene oxide microspheres having a carbon/oxygen ratio of 2.5-5;

(2) fully mixing 100 parts by weight of terephthalic acid, 48-67 parts by weight of ethylene glycol, and 0.02 part by weight of sodium acetate by stirring, and subjecting the mixture to an esterification reaction at 250° C.; and (3) adding 0.0117-5.85 parts by weight of the pleated graphene oxide microspheres obtained in Step (1) and 0.018 part by weight of a catalyst to the esterification product obtained in Step (2), incubating with stirring for 1-3 hrs, heating to 285° C. and evacuating to allow the reaction to proceed until no heat is released from the system, and then granulating with water cooling to obtain a graphene/PET nanocomposite material.

Further, the atomization drying temperature in Step (1) is 130 to 200° C. The stirring speed in Step (3) is 140-200 rpm. The catalyst in Step (3) is an antimony-based catalyst, including an oxide, an inorganic salt, and an organic compound of antimony. The catalyst in Step (3) is a titanium-based catalyst, including an oxide, an inorganic salt, and an organic compound of titanium. The catalyst in Step (3) is a germanium-based catalyst, including an oxide, an inorganic salt, and an organic compound of germanium.

The auxiliary agent is composed of one or more of an antioxidant, an inorganic filler, a toughening agent, and a gloss improving agent in any proportion.

The spinning temperature is 270 to 290° C., and the winding speed is 3000-5000 m/min.

The beneficial effects are as follows. (1) The pleated graphene oxide microspheres added after esterification can gradually unfold and disassociate into single-layer flake-like graphene oxide. During the polymerization of PET, the hydroxyl group and carboxyl group on the surface of graphene oxide react with the PET molecules in the system, so that the PET molecules are grafted to the surface of graphene. This improves the compatibility therebetween, and greatly reduces the amount of graphene added while reducing the stacking, so that the method of the present invention has high cost performance. In contrast, the addition of graphene oxide in the esterification stage will cause thermal reduction of graphene oxide. As the reaction proceeds, the graphene produced after reduction will be gradually stacked into an aggregate, which is not conducive to the improvement of performance, and causes failure in continuous high-speed spinning due to the presence of the aggregate. (2) By adding graphene oxide after esterification, the impact on the esterification process is avoided. For the polymerization process, the introduction of pleated graphene oxide microspheres has no obvious impact on the polymerization process, so the method of the present invention is more reasonable and efficient, and has lower cost in practical production. (3) After the graphene is added, the composite material can be continuously spun at a high speed, and the resulting fiber has significantly improved UV resistance, flame retardancy and electrical conductivity.

Solution VIII:

A graphene/polyester nanocomposite material is provided, which comprises a polyester and single-layer graphene sheets uniformly dispersed in the polyester, where the surface of the graphene sheet and the polyester molecule are connected by a covalent bond; and the polyester molecule is one or more selected from the group consisting of polytrimethylene terephthalate (PTT), polybutylene terephthalate (PBT), and poly(1,4-cyclohexanedimethyl terephthalate) (PCT)

A method for preparing a graphene/polyester nanocomposite material comprises the following steps:

(1) drying a dispersion of single-layer graphene oxide with a size of 1-50 μm by atomization drying to obtain pleated graphene oxide microspheres having a carbon/oxygen ratio of 2.5-5;

(2) fully mixing 100 parts by weight of terephthalic acid, 50-150 parts by weight of a diol, and 0.01-0.5 part by weight of a catalyst by stirring, and subjecting the mixture to an esterification reaction at 200-260° C. until no water is produced; and (3) adding 0.02-10 parts by weight of the pleated graphene oxide microspheres obtained in Step (1) and 0.01-1 part by weight of a catalyst to the esterification product obtained in Step (2), incubating with stirring for 1-3 hrs, heating to 240-310° C. and evacuating to allow the reaction to proceed until no heat is released from the system, and then granulating with water cooling to obtain a graphene/polyester nanocomposite material.

Further, the atomization drying temperature in Step (1) is 130 to 200° C. The diol in Step (2) is one or more of butanediol, propylene glycol, and 1,4-cyclohexanedimethanol. The diol in Step (2) is butanediol in an amount of 60-76.8 parts by weight. The diol in Step (2) is propylene glycol in an amount of 50-70 parts by weight. The diol in Step (2) is 1,4-cyclohexanedimethanol in an amount of 121.4-147.5 parts by weight. The catalyst in Step (2) is one or more of an oxide, an inorganic salt and an organic compound of sodium, titanium, lead, and tin. The catalyst in Step (3) is one or more of an oxide, an inorganic salt and an organic compound of antimony, titanium, lead, and tin.

The beneficial effects are as follows. Pleated graphene oxide microspheres are first obtained by atomization drying. By sound choice of the carbon/oxygen ratio in and the size of graphene oxide, the pleated graphene oxide microspheres are allowed to gradually unfold and disassociate into flake-like graphene oxide in various polyester oligomers. During the polymerization of the polyester, the hydroxyl group and carboxyl group on the surface of graphene oxide react with the polyester molecules in the system, so that the polyester molecules are grafted to the surface of graphene. This improves the compatibility therebetween, and contributes to the improvement of the mechanical properties, the electrical conductivity, and UV resistance. By adding graphene oxide after esterification, the impact on the esterification process is avoided, whereby the method is more reasonable and efficient, and has lower cost in practical production process, and also prevents the graphene oxide from stacking to form an aggregate during the esterification stage. Throughout the whole polymerization process of the polyester, no other materials are introduced except for the pleated graphene oxide microspheres, which minimize the impact of the introduction of graphene on the process and equipment. Thus the present invention has a broad prospect of application. The obtained graphene/polyester composite material has excellent mechanical properties and electrical conductivity, and can be used in the production of functionalized polyester fibers.

Solution IX:

A method for preparing a graphene/nylon 6 nanocomposite material comprises the following steps:

(1) drying a dispersion of single-layer graphene oxide with a size of 1-50 μm by atomization drying to obtain pleated graphene oxide microspheres having a carbon/oxygen ratio of 2.5-5;

(2) adding 0.01-3.5 parts by weight of pleated graphene oxide microspheres and 1-3 parts by weight of deionized water to 100 parts by weight of caprolactam melt, and fully stirring at 80° C. at a high speed (300-500 rpm) to form a dispersion; and (3) preparing a graphene/nylon 6 nanocomposite material in a batch reactor or in a VK tube, where in the batch reactor:

under a nitrogen atmosphere, the dispersion is added to the polycondenzation reactor, heated to 250-270° C., and reacted under 0.5-1 MPa for 2-4 hrs and then under vacuum for 4-6 hrs to obtain a polymer melt; and finally, the polymer melt is granulated with water cooling to obtain a graphene/nylon 6 nanocomposite material; and in the VK tube:

the dispersion is continuously polymerized in the VK tube, where the polymerization temperature is 260° C., and the polymerization time is 20 hrs; and the polymer melt is granulated with water cooling to obtain a graphene/nylon 6 nanocomposite material.

Further, the temperature for atomization drying in Step (1) is 130-160° C.

The beneficial effects are as follows. (1) Most conventional graphene powders have a highly stacked graphene structure, cannot be dispersed into a single-layer graphene after adding to a polymerization system, and even may undergo secondary stacking, reducing the overall performance of the material. In the present invention, pleated graphene oxide microspheres are prepared firstly by atomization drying. This pleated microsphere structure greatly reduces the stacking between graphene oxide sheets. By sound choice of the carbon/oxygen ratio in and the size of graphene oxide, the pleated graphene oxide microspheres are allowed to gradually unfold and disassociate in caprolactam melt, and are thermally reduced at the same time to form single-layer flake-like graphene. Throughout the whole polymerization process, nylon 6 molecules are gradually grafted onto the graphene surface, which improves the compatibility therebetween. Excellent mechanical properties (such as toughness and spinnability) are still maintained at a high dosage; and to a great extent, the reinforcing effect, barrier property, UV resistance and others advantages of graphene are exerted. Moreover, the obtained material has a very low percolation threshold. (2) Graphene/nylon 6 composite material is obtained by in-situ polymerization of caprolactam with high-quality single-layer graphene oxide as raw material. Compared with neat nylon 6 products, the overall performance has been improved in various aspects, such as mechanical properties, high-temperature resistance, anti-UV aging performance, etc. At the same time, the toughness of the material is not degraded, and the molecular weight of the polymer is controllable, and will not decrease as the amount of graphene added increases. Graphene is both a nucleating agent and a nano-reinforcing filler in the polymer matrix, and also plays a role in UV protection. (3) Graphene is well dispersed in the polymer matrix, and the graphene sheet has a large transverse dimension, so the amount of graphene added is small (less than 0.5%), and the final product has good processability and can be subjected to multi-tow high-speed spinning in industry. (4) The entire preparation process is simple and effective, and it does not need to modify the existing nylon 6 polymerization equipment. It is a highly competitive production technology. Since the addition of water is avoided, continuous polymerization can be carried out in a VK tube.

DESCRIPTION OF THE EMBODIMENTS

The present invention will be specifically described by the following examples, which are only used to further illustrate the present invention, and are not to be construed as limiting the scope of the present invention. Some non-essential changes and adjustments made by those skilled in the art according to the disclosure the present invention are encompassed in the scope of protection of the present invention.

Example 1-1

(1) A single-layer graphene oxide dispersion was dried by atomization drying at a temperature of 130° C. to obtain graphene oxide microspheres, where the graphene oxide sheet has a size of 1-3 μm, and the carbon/oxygen ratio is 2.5.

(2) 1000 g of terephthalic acid, 530 g of ethylene glycol, and 0.2 g of sodium acetate were fully mixed by stirring, and subjected to an esterification reaction at 250° C., until no water was produced.

(3) 1.17 g of the pleated graphene oxide microspheres obtained in Step (1) and 0.18 g of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

Figure 1:
FIG. 1 is a photograph of a graphene/PET nanocomposite material prepared in the present invention.
Figure 2:
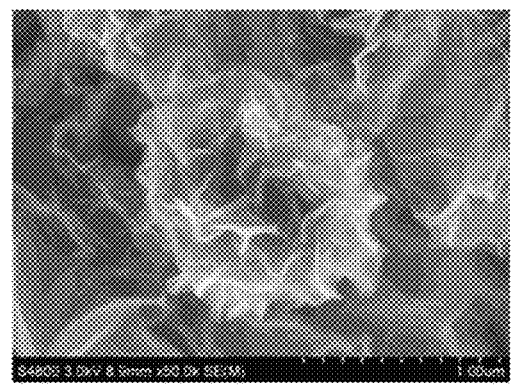
FIG. 2 is an SEM image of pleated graphene oxide microspheres prepared in the present invention.

After the above steps, a graphene/PET nanocomposite material is obtained, as shown in FIG. 1. The SEM image of the obtained pleated graphene oxide microspheres is shown in FIG. 2. Specific properties of the composite material are shown in Table 1.

Example 1-2

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 1000 g of terephthalic acid, 530 g of ethylene glycol, and 0.2 g of sodium acetate were fully mixed by stirring, and subjected to an esterification reaction at 250° C., until no water was produced.

(3) 1.17 g of the pleated graphene oxide microspheres obtained in Step (1) and 0.18 g of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

After the above steps, a graphene/PET nanocomposite material is obtained. Specific properties are shown in Table 1.

Example 1-3

(1) A single-layer graphene oxide dispersion was dried by atomization drying at a temperature of 130° C. to obtain graphene oxide microspheres, where the graphene oxide sheet has a size of 40-45 μm, and the carbon/oxygen ratio is 2.5.

(2) 1000 g of terephthalic acid, 530 g of ethylene glycol, and 0.2 g of sodium acetate were fully mixed by stirring, and subjected to an esterification reaction at 250° C., until no water was produced.

(3) 1.17 parts by weight of the pleated graphene oxide microspheres obtained in Step (1) and 0.18 g of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

After the above steps, a graphene/PET nanocomposite material is obtained. Specific properties are shown in Table 1.

Example 1-4

(1) A single-layer graphene oxide dispersion was dried by atomization drying at a temperature of 160° C. to obtain graphene oxide microspheres, where the graphene oxide sheet has a size of 10-15 μm, and the carbon/oxygen ratio is 5.

(2) 1000 g of terephthalic acid, 530 g of ethylene glycol, and 0.2 g of sodium acetate were fully mixed by stirring, and subjected to an esterification reaction at 250° C., until no water was produced.

(3) 1.17 g of the pleated graphene oxide microspheres obtained in Step (1) and 0.18 g of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

After the above steps, a graphene/PET nanocomposite material is obtained. Specific properties are shown in Table 1.

Example 1-5

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 1000 g of terephthalic acid, 530 g of ethylene glycol, and 0.2 g of sodium acetate were fully mixed by stirring, and subjected to an esterification reaction at 250° C., until no water was produced.

(3) 11.7 g of the pleated graphene oxide microspheres obtained in Step (1) and 0.18 g of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

After the above steps, a graphene/PET nanocomposite material is obtained. Specific properties are shown in Table 1.

Example 1-6

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 1000 g of terephthalic acid, 530 g of ethylene glycol, and 0.2 g of sodium acetate were fully mixed by stirring, and subjected to an esterification reaction at 250° C., until no water was produced.

(3) 58.5 g of the pleated graphene oxide microspheres obtained in Step (1) and 0.18 g of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

After the above steps, a graphene/PET nanocomposite material is obtained. Specific properties are shown in Table 1.

Comparative Example 1-1

PET was prepared following the method as described in Example 1, except that no pleated graphene oxide microspheres were added during the preparation process. The performances are shown in Table 1.

Comparative Example 1-2

(1) A single-layer graphene oxide dispersion was dried by atomization drying at a temperature of 130° C. to obtain graphene oxide microspheres, where the graphene oxide sheet has a size of 0.3-0.7 μm, and the carbon/oxygen ratio is 2.5.

(2) 1000 g of terephthalic acid, 530 g of ethylene glycol, and 0.2 g of sodium acetate were fully mixed by stirring, and subjected to an esterification reaction at 250° C., until no water was produced.

(3) 1.17 g of the pleated graphene oxide microspheres obtained in Step (1) and 0.18 g of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

After the above steps, a graphene/PET nanocomposite material is obtained. Specific properties are shown in Table 1.

Comparative Example 1-3

(1) A single-layer graphene oxide dispersion was dried by atomization drying at a temperature of 130° C. to obtain graphene oxide microspheres, where the graphene oxide sheet has a size of 70-80 μm, and the carbon/oxygen ratio is 2.5.

(2) 1000 g of terephthalic acid, 530 g of ethylene glycol, and 0.2 g of sodium acetate were fully mixed by stirring, and subjected to an esterification reaction at 250° C., until no water was produced.

(3) 1.17 g of the pleated graphene oxide microspheres obtained in Step (1) and 0.18 g of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

After the above steps, a graphene/PET nanocomposite material is obtained. Specific properties are shown in Table 1.

Comparative Example 1-4

(1) A single-layer graphene oxide dispersion was dried by atomization drying at a temperature of 220° C. to obtain graphene oxide microspheres, where the graphene oxide sheet has a size of 10-15 μm, and the carbon/oxygen ratio is 10.

(2) 1000 g of terephthalic acid, 530 g of ethylene glycol, and 0.2 g of sodium acetate were fully mixed by stirring, and subjected to an esterification reaction at 250° C., until no water was produced.

(3) 1.17 parts by weight of the pleated graphene oxide microspheres obtained in Step (1) and 0.18 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

After the above steps, a graphene/PET nanocomposite material is obtained. Specific properties are shown in Table 1.

Comparative Example 1-5

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 1000 g of terephthalic acid, 530 g of ethylene glycol, and 0.2 g of sodium acetate were fully mixed by stirring, and subjected to an esterification reaction at 250° C., until no water was produced.

(3) 93.6 g of the pleated graphene oxide microspheres obtained in Step (1) and 0.18 g of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

After the above steps, a graphene/PET nanocomposite material is obtained. Specific properties are shown in Table 1.

unfolded into a flake-like graphene oxide after being added to a polymerization system, and can only be used as a pleated spherical filler to reinforce the composite material, resulting in a small increase in the tensile strength and modulus and a slightly decrease in the elongation at break. When the size is in the range of 1-50 μm, as the size increases, graphene oxide can exert a more potent reinforcing effect.

It can be found through analysis of Comparative Example 1-1, Example 1-2, Example 1-4, and Comparative Example 1-4 that as the carbon/oxygen ratio increases, the performance of the composite material becomes better. This is because as the carbon/oxygen ratio increases, the graphene has fewer defects and better performances, which make the composite perform better. However, the carbon/oxygen ratio cannot be too high; otherwise the bonding between graphene oxide sheets is too strong, and the graphene oxide cannot be unfolded during polymerization, so it cannot be effectively enhance, or even greatly reduce the elongation at break (Comparative Example 4).

It can be found through analysis of Comparative Example 1-1, Example 1-2, Example 1-5, Example 1-6, and Comparative Example 1-5 that the increase in the amount of graphene oxide increases the mechanical properties and greatly improves the electrical conductivity of the material. After too much graphene oxide is added, although the electrical conductivity is further improved, the mechanical properties of the material are reduced. This is due to the stacking of excessive graphene, which reduces the reinforcing effect (Comparative Example 1-5)

Example 1-7

(1) A single-layer graphene oxide dispersion was dried by atomization drying at a temperature of 200° C. to obtain

TABLE 1

Specific parameters and properties of the example

| | Carbon/oxygen ratio in graphene oxide | Size of graphene oxide (μm) | Amount of graphene oxide (wt %) | Yield strength (MPa) | Tensile modulus (GPa) | Elongation at break (%) | Electrical conductivity (S/m) |
|---|---|---|---|---|---|---|---|
| Example 1-1 | 2.5 | 1-3 | 0.1 | 52 | 2.38 | 91 | $10^{-16}$ |
| Example 1-2 | 2.5 | 10-15 | 0.1 | 56 | 2.44 | 90 | $10^{-16}$ |
| Example 1-3 | 2.5 | 40-45 | 0.1 | 58 | 2.58 | 88 | $10^{-16}$ |
| Example 1-4 | 5 | 10-15 | 0.1 | 59 | 2.61 | 83 | $10^{-16}$ |
| Example 1-5 | 2.5 | 10-15 | 1 | 64 | 2.67 | 78 | $10^{-13}$ |
| Example 1-6 | 2.5 | 10-15 | 5 | 60 | 2.74 | 77 | $10^{-3}$ |
| Comparative Example 1-1 | — | — | — | 42 | 2.1 | 85 | $10^{-16}$ |
| Comparative Example 1-2 | 2.5 | 0.3-0.7 | 0.1 | 44 | 2.15 | 86 | $10^{-16}$ |
| Comparative Example 1-3 | 2.5 | 70-80 | 0.1 | 45 | 2.3 | 67 | $10^{-16}$ |
| Comparative Example 1-4 | 10 | 10-15 | 0.1 | 47 | 2.14 | 62 | $10^{-16}$ |
| Comparative Example 1-5 | 2.5 | 10-15 | 8 | 51 | 2.36 | 44 | $10^{-2}$ |

It can be found through analysis of Comparative Example 1-1, Comparative Example 1-2, Example 1-1, Example 1-2, Example 1-3, and Comparative Example 1-3 that while the carbon/oxygen ratio in graphene oxide and the amount of graphene oxide added are kept unchanged, the selection of graphene oxide with a size in a suitable range results in a composite material with the optimum performances. In Comparative Example 1-2, the size of graphene oxide is too small, so the graphene oxide cannot be an effective reinforcing material itself; and in Comparative Example 1-3, the size of graphene oxide is too large, it cannot be effectively graphene oxide microspheres, where the graphene oxide sheet has a size of 40-50 μm, and the carbon/oxygen ratio is 5.

(2) 1000 g of terephthalic acid, 530 g of ethylene glycol, and 0.2 g of sodium acetate were fully mixed by stirring, and subjected to an esterification reaction at 250° C., until no water was produced.

(3) 58.5 g of the pleated graphene oxide microspheres obtained in Step (1) and 0.18 g of antimony ethylene glycol were added to the esterification product obtained in Step (2), incubated with stirring for 3 hrs at a stirring speed of 140 rpm, heated to 285° C. and evacuated to allow the reaction to proceed until no heat was released from the system, and then granulated with water cooling to obtain a graphene/PET nanocomposite material. The graphene/PET nanocomposite material is tested to have good mechanical and electrical properties.

Example 1-8

(1) A single-layer graphene oxide dispersion was dried by atomization drying at a temperature of 200° C. to obtain graphene oxide microspheres, where the graphene oxide sheet has a size of 40-50 μm, and the carbon/oxygen ratio is 5.

(2) 1000 g of terephthalic acid, 530 g of ethylene glycol, and 0.2 g of sodium acetate were fully mixed by stirring, and subjected to an esterification reaction at 250° C., until no water was produced.

(3) 0.117 g of the pleated graphene oxide microspheres obtained in Step (1) and 0.18 g of antimony ethylene glycol were added to the esterification product obtained in Step (2), incubated with stirring for 1 hrs at a stirring speed of 200 rpm, heated to 285° C. and evacuated to allow the reaction to proceed until no heat was released from the system, and then granulated with water cooling to obtain a graphene/PET nanocomposite material. The graphene/PET nanocomposite material is tested to have good mechanical and electrical properties.

Example 2-1

(1) A single-layer graphene oxide dispersion was dried by atomization drying at a temperature of 130° C. to obtain graphene oxide microspheres, where the graphene oxide sheet has a size of 1-3 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) The composite material obtained in Step (3) was dried, pre-crystallized, solid-phase polycondensed, cooled, and subjected to high-speed melt spinning. The drying temperature was 175° C., the pre-crystallization temperature was 180° C., the solid-phase polycondensation temperature was 215° C., the intrinsic viscosity after the solid-phase polycondensation was 1.1, the cooling temperature was 70° C., the spinning temperature was 290° C., the winding speed was 4000 m/min, and the draw ratio was 3.

Figure 3:
FIG. 3 is a photograph of a graphene/polyester composite fiber for a cord prepared in the present invention.

After the above steps, a graphene/polyester composite fiber for a cord is obtained, as shown in FIG. 3. Specific properties are shown in Table 2.

Example 2-2

(1) A single-layer graphene oxide dispersion was dried by atomization drying at a temperature of 130° C. to obtain graphene oxide microspheres, where the graphene oxide sheet has a size of 6-10 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) The composite material obtained in Step (3) was dried, pre-crystallized, solid-phase polycondensed, cooled, and subjected to high-speed melt spinning. The drying temperature was 175° C., the pre-crystallization temperature was 180° C., the solid-phase polycondensation temperature was 215° C., the intrinsic viscosity after the solid-phase polycondensation was 1.1, the cooling temperature was 70° C., the spinning temperature was 290° C., the winding speed was 4000 m/min, and the draw ratio was 3.

After the above steps, a graphene/polyester composite fiber for a cord is obtained. Specific properties are shown in Table 2.

Example 2-3

(1) A single-layer graphene oxide dispersion was dried by atomization drying at a temperature of 160° C. to obtain graphene oxide microspheres, where the graphene oxide sheet has a size of 6-10 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) The composite material obtained in Step (3) was dried, pre-crystallized, solid-phase polycondensed, cooled, and subjected to high-speed melt spinning. The drying temperature was 175° C., the pre-crystallization temperature was 180° C., the solid-phase polycondensation temperature was 215° C., the intrinsic viscosity after the solid-phase polycondensation was 1.1, the cooling temperature was 70° C., the spinning temperature was 290° C., the winding speed was 4000 m/min, and the draw ratio was 3.

After the above steps, a graphene/polyester composite fiber for a cord is obtained. Specific properties are shown in Table 2.

Example 2-4

(1) A single-layer graphene oxide dispersion was dried by atomization drying at a temperature of 130° C. to obtain graphene oxide microspheres, where the graphene oxide sheet has a size of 6-10 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.585 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) The composite material obtained in Step (3) was dried, pre-crystallized, solid-phase polycondensed, cooled, and subjected to high-speed melt spinning. The drying temperature was 175° C., the pre-crystallization temperature was 180° C., the solid-phase polycondensation temperature was 215° C., the intrinsic viscosity after the solid-phase polycondensation was 1.12, the cooling temperature was 70° C., the spinning temperature was 290° C., the winding speed was 4000 m/min, and the draw ratio was 3.

After the above steps, a graphene/polyester composite fiber for a cord is obtained. Specific properties are shown in Table 2.

Example 2-5

(1) A single-layer graphene oxide dispersion was dried by atomization drying at a temperature of 130° C. to obtain graphene oxide microspheres, where the graphene oxide sheet has a size of 6-10 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 1.17 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET composite material.

(4) The composite material obtained in Step (3) was dried, pre-crystallized, solid-phase polycondensed, cooled, and subjected to high-speed melt spinning. The drying temperature was 175° C., the pre-crystallization temperature was 180° C., the solid-phase polycondensation temperature was 215° C., the intrinsic viscosity after the solid-phase polycondensation was 1.14, the cooling temperature was 70° C., the spinning temperature was 290° C., the winding speed was 4000 m/min, and the draw ratio was 3.

After the above steps, a graphene/polyester composite fiber for a cord is obtained. Specific properties are shown in Table 2.

Comparative Example 2-1

PET was prepared following the method as described in Example 1, except that no pleated graphene oxide microspheres were added during the preparation process. The performances are shown in Table 2.

Comparative Example 2-2

(1) A single-layer graphene oxide dispersion was dried by atomization drying at a temperature of 130° C. to obtain graphene oxide microspheres, where the graphene oxide sheet has a size of 0.3-0.7 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) The composite material obtained in Step (3) was dried, pre-crystallized, solid-phase polycondensed, cooled, and subjected to high-speed melt spinning. The drying temperature was 175° C., the pre-crystallization temperature was 180° C., the solid-phase polycondensation temperature was 215° C., the intrinsic viscosity after the solid-phase polycondensation was 1.1, the cooling temperature was 70° C., the spinning temperature was 290° C., the winding speed was 4000 m/min, and the draw ratio was 3.

After the above steps, a graphene/polyester composite fiber for a cord is obtained. Specific properties are shown in Table 2.

Comparative Example 2-3

(1) A single-layer graphene oxide dispersion was dried by atomization drying at a temperature of 130° C. to obtain graphene oxide microspheres, where the graphene oxide sheet has a size of 40-45 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) The composite material obtained in Step (3) was dried, pre-crystallized, solid-phase polycondensed, cooled, and subjected to high-speed melt spinning. The drying temperature was 175° C., the pre-crystallization temperature was 180° C., the solid-phase polycondensation temperature was 215° C., the intrinsic viscosity after the solid-phase polycondensation was 1.31, the cooling temperature was 70° C., the spinning temperature was 290° C., the winding speed was 4000 m/min, and the draw ratio was 3.

After the above steps, the obtained melt has a too large viscosity, and has difficulty in continuous spinning.

Comparative Example 2-4

(1) A single-layer graphene oxide dispersion was dried by atomization drying at a temperature of 220° C. to obtain graphene oxide microspheres, where the graphene oxide sheet has a size of 6-10 μm, and the carbon/oxygen ratio is 10.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) The composite material obtained in Step (3) was dried, pre-crystallized, solid-phase polycondensed, cooled, and subjected to high-speed melt spinning. The drying temperature was 175° C., the pre-crystallization temperature was 180° C., the solid-phase polycondensation temperature was 215° C., the intrinsic viscosity after the solid-phase polycondensation was 1.1, the cooling temperature was 70° C., the spinning temperature was 290° C., the winding speed was 4000 m/min, and the draw ratio was 3.

After the above steps, it is found that the spinneret is clogged, the continuity of the spun yarn is less good, and the frequency of yarn breakage is high.

Comparative Example 2-5

(1) A single-layer graphene oxide dispersion was dried by atomization drying at a temperature of 130° C. to obtain graphene oxide microspheres, where the graphene oxide sheet has a size of 6-10 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 5.85 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET composite material.

(4) The composite material obtained in Step (3) was dried, pre-crystallized, solid-phase polycondensed, cooled, and subjected to high-speed melt spinning. The drying temperature was 175° C., the pre-crystallization temperature was 180° C., the solid-phase polycondensation temperature was 215° C., the intrinsic viscosity after the solid-phase polycondensation was 1.37, the cooling temperature was 70° C., the spinning temperature was 290° C., the winding speed was 4000 m/min, and the draw ratio was 3.

After the above steps, it is found that the melt viscosity is too high, the spinning is difficult, and the continuity is poor.

TABLE 2

Specific parameters and properties of the example

| | Carbon/oxygen ratio in graphene oxide | Size of graphene oxide (μm) | Amount of graphene oxide (wt %) | Breaking strength (cN/dtex) | Elongation at break (%) |
|---|---|---|---|---|---|
| Example 2-1 | 2.5 | 1-3 | 0.1 | 9.35 | 17.5 |
| Example 2-2 | 2.5 | 6-10 | 0.1 | 9.42 | 17.3 |
| Example 2-3 | 5 | 6-10 | 0.1 | 9.48 | 17.3 |
| Example 2-4 | 2.5 | 6-10 | 0.5 | 9.67 | 16.5 |
| Example 2-5 | 2.5 | 6-10 | 1 | 9.92 | 15.2 |
| Comparative Example 2-1 | — | — | — | 9.13 | 17.2 |
| Comparative Example 2-2 | 2.5 | 0.3-0.7 | 0.1 | 8.83 | 17.4 |
| Comparative Example 2-3 | 2.5 | 40-45 | 0.1 | — | — |
| Comparative Example 2-4 | 10 | 6-10 | 0.1 | — | — |
| Comparative Example 2-5 | 2.5 | 6-10 | 5 | — | — |

It can be found through analysis of Comparative Example 2-1, Comparative Example 2-2, Example 2-1, Example 2-2, and Comparative Example 2-3 that while the carbon/oxygen ratio in graphene oxide and the amount of graphene oxide added are kept unchanged, increasing the graphene size within a suitable range can effectively increase the breaking strength of the fiber. In Comparative Example 2-2, the size of graphene oxide is too small, so the graphene oxide cannot be an effective reinforcing material itself. In Comparative Example 2-3, the size of graphene oxide is too large, the viscosity increasing effect is obvious after being added to a polymerization system; the melt is tackified in the solid-phase polycondensation stage, so the viscosity is further increased, making the spinning difficult, which is not conducive to continuous production. Therefore, the size is defined in the range of 1-10 μm, and graphene oxide can exert a more potent reinforcing effect.

It can be found through analysis of Comparative Example 2-1, Example 2-2, Example 2-3, and Comparative Example 2-4 that as the carbon/oxygen ratio increases, the performance of the composite fiber becomes better. This is because as the carbon/oxygen ratio increases, the graphene has fewer defects and better performances, which make the composite perform better. However, the carbon/oxygen ratio cannot be too high; otherwise the bonding between graphene oxide sheets is too strong, and the graphene oxide is still maintained stacked during polymerization, and clogs the spinneret, causing difficulty in continuous production (Comparative Example 2-4).

It can be found through analysis of Comparative Example 2-1, Example 2-2, Example 2-4, Example 2-5, and Comparative Example 2-5 that the increase in the amount of graphene oxide allows the breaking strength of the composite fiber to increase greatly, which can be attributed to the reinforcing effect of graphene. After too much graphene oxide is added, the viscosity of the system is too large, and the melt spinnability is greatly reduced after tackification, causing difficulty in continuous production (Comparative Example 2-5).

Example 2-6

(1) A single-layer graphene oxide dispersion was dried by atomization drying at a temperature of 130° C. to obtain graphene oxide microspheres, where the graphene oxide sheet has a size of 3-5 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.95 part by weight of the pleated graphene oxide microspheres obtained in Step (1) and 0.018 part by weight of antimony ethylene glycol were added to the esterification product obtained in Step (2), incubated with stirring for 3 hrs at a stirring speed of 140 rpm, heated to 285° C. and evacuated to allow the reaction to proceed until no heat was released from the system, and then granulated with water cooling to obtain a graphene/PET composite material.

(4) The composite material obtained in Step (3) was dried, pre-crystallized, solid-phase polycondensed, cooled, and subjected to high-speed melt spinning. The drying temperature was 170° C., the pre-crystallization temperature was 175° C., the solid-phase polycondensation temperature was 210° C., the intrinsic viscosity after the solid-phase polycondensation was 0.9, the cooling temperature was 60° C., the spinning temperature was 290° C., the winding speed was 5000 m/min, and the draw ratio was 4.

The obtained graphene/polyester composite fiber for a cord is tested to have perfect mechanical and electrical properties.

Example 2-7

(1) A single-layer graphene oxide dispersion was dried by atomization drying at a temperature of 200° C. to obtain graphene oxide microspheres, where the graphene oxide sheet has a size of 3-5 μma, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.95 part by weight of the pleated graphene oxide microspheres obtained in Step (1) and 0.018 part by weight of antimony ethylene glycol were added to the esterification product obtained in Step (2), incubated with stirring for 1 hrs at a stirring speed of 200 rpm, heated to 285° C. and evacuated to allow the reaction to proceed until no heat was released from the system, and then granulated with water cooling to obtain a graphene/PET composite material.

(4) The composite material obtained in Step (3) was dried, pre-crystallized, solid-phase polycondensed, cooled, and subjected to high-speed melt spinning. The drying temperature was 180° C., the pre-crystallization temperature was 185° C., the solid-phase polycondensation temperature was 220° C., the intrinsic viscosity after the solid-phase polycondensation was 1.2, the cooling temperature was 80° C., the spinning temperature was 270° C., the winding speed was 3000 m/min, and the draw ratio was 1.5.

The obtained graphene/polyester composite fiber for a cord is tested to have perfect mechanical and electrical properties.

Example 3-1

(1) A single-layer graphene oxide dispersion was dried by atomization drying at a temperature of 130° C. to obtain graphene oxide microspheres, where the graphene oxide sheet has a size of 1-3 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.585 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

Figure 4:
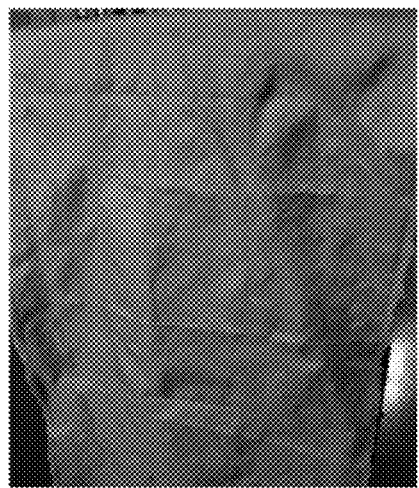
FIG. 4 is a photograph of a multi-functional graphene/polyester composite fabric prepared in the present invention.

After the above steps, a multi-functional graphene/polyester composite fabric is obtained. A photo of the graphene/polyester composite fabric is shown in FIG. 4. Specific properties are shown in Tables 3 and 4.

Example 3-2

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.585 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

After the above steps, a multi-functional graphene/polyester composite fabric is obtained. Specific properties are shown in Tables 3 and 4.

Example 3-3

(1) A single-layer graphene oxide dispersion was dried by atomization drying at a temperature of 130° C. to obtain graphene oxide microspheres, where the graphene oxide sheet has a size of 40-45 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.585 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

After the above steps, a multi-functional graphene/polyester composite fabric is obtained. Specific properties are shown in Tables 3 and 4.

Example 3-4

(1) A single-layer graphene oxide dispersion was dried by atomization drying at a temperature of 160° C. to obtain graphene oxide microspheres, where the graphene oxide sheet has a size of 10-15 µm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.585 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.4 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

After the above steps, a multi-functional graphene/polyester composite fabric is obtained. Specific properties are shown in Tables 3 and 4.

Example 3-5

(1) A single-layer graphene oxide dispersion was dried by atomization drying at a temperature of 130° C. to obtain graphene oxide microspheres, where the graphene oxide sheet has a size of 10-15 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 1.17 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.3 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 in/min, the draw ratio was 1.5, and the denier number was 100D. A shuttle loom was used for weaving.

After the above steps, a multi-functional graphene/polyester composite fabric is obtained. Specific properties are shown in Tables 3 and 4.

Example 3-6

(1) A single-layer graphene oxide dispersion was dried by atomization drying at a temperature of 130° C. to obtain graphene oxide microspheres, where the graphene oxide sheet has a size of 10-15 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 5.85 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.5 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

After the above steps, a multi-functional graphene/polyester composite fabric is obtained. Specific properties are shown in Tables 3 and 4.

Comparative Example 3-1

PET was prepared following the method as described in Example 1, except that no pleated graphene oxide microspheres were added during the preparation process. The performances are shown in Tables 3 and 4.

Comparative Example 3-2

(1) A single-layer graphene oxide dispersion was dried by atomization drying at a temperature of 130° C. to obtain graphene oxide microspheres, where the graphene oxide sheet has a size of 0.3-0.7 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.585 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.3 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

After the above steps, a graphene/polyester composite fabric is obtained. Specific properties are shown in Tables 3 and 4.

Comparative Example 3-3

(1) A single-layer graphene oxide dispersion was dried by atomization drying at a temperature of 130° C. to obtain graphene oxide microspheres, where the graphene oxide sheet has a size of 70-80 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.585 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

After the above steps, it is found that the spinneret is clogged, the continuity of the spun yarn is less good, and the frequency of yarn breakage is high.

Comparative Example 3-4

(1) A single-layer graphene oxide dispersion was dried by atomization drying at a temperature of 220° C. to obtain graphene oxide microspheres, where the graphene oxide sheet has a size of 10-15 μm, and the carbon/oxygen ratio is 10.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.585 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

After the above steps, it is found that the spinneret is clogged, the continuity of the spun yarn is less good, and the frequency of yarn breakage is high.

Comparative Example 3-5

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

A graphene/polyester composite fabric is obtained. Specific properties are shown in Tables 3 and 4.

Comparative Example 3-6

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 9.36 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, textured, woven, dyed, and finished to obtain a multi-functional graphene/polyester composite fabric. The spinning temperature was 280° C., the spinning speed was 3600 m/min, the draw ratio was 1.5, and the denier number was 100D. A shuttle loom was used for weaving.

After the above steps, it is found that the spinneret is clogged, the continuity of the spun yarn is less good, and the frequency of yarn breakage is high.

TABLE 3

Specific parameters of the examples

| | Carbon/oxygen ratio in graphene oxide | Size of graphene oxide (μm) | Amount of graphene oxide (wt %) |
|---|---|---|---|
| Example 3-1 | 2.5 | 1-3 | 0.5 |
| Example 3-2 | 2.5 | 10-15 | 0.5 |
| Example 3-3 | 2.5 | 40-45 | 0.5 |
| Example 3-4 | 5 | 10-15 | 0.5 |
| Example 3-5 | 2.5 | 10-15 | 1 |
| Example 3-6 | 2.5 | 10-15 | 5 |
| Comparative Example 3-1 | — | — | — |
| Comparative Example 3-2 | 2.5 | 0.3-0.7 | 0.5 |
| Comparative Example 3-3 | 2.5 | 70-80 | 0.5 |
| Comparative Example 3-4 | 10 | 10-15 | 0.5 |
| Comparative Example 3-5 | 2.5 | 10-15 | 0.1 |
| Comparative Example 3-6 | 2.5 | 10-15 | 8 |

TABLE 4

Specific properties of the examples

| | Flame spread upon burning in 45° direction/length of damage (cm) | Electrical conductivity (S/m) | UV protection factor (UPF) of fabric |
|---|---|---|---|
| Example 3-1 | N/5.1 | $10^{-9}$ | 76.1 |
| Example 3-2 | N/4.6 | $10^{-9}$ | 82.6 |
| Example 3-3 | N/4.2 | $10^{-9}$ | 85.4 |
| Example 3-4 | N/3.1 | $10^{-9}$ | 86.2 |
| Example 3-5 | N/2.5 | $10^{-7}$ | 108.3 |
| Example 3-6 | N/1.8 | $10^{-3}$ | 146.8 |
| Comparative Example 3-1 | Y/10.2 | $10^{-16}$ | 5.1 |
| Comparative Example 3-2 | N/6.4 | $10^{-12}$ | 20.8 |
| Comparative Example 3-3 | — | — | — |
| Comparative Example 3-4 | — | — | — |
| Comparative Example 3-5 | N/6.3 | $10^{-16}$ | 35.6 |
| Comparative Example 3-6 | — | — | — |

It can be found through analysis of Comparative Example 3-1, Comparative Example 3-2, Example 3-1, Example 3-2, Example 3-3, and Comparative Example 3-3 that while the carbon/oxygen ratio in graphene oxide and the amount of graphene oxide added are kept unchanged, the selection of graphene oxide with a size in a suitable range results in a functional fabric with the optimum performances. In Comparative Example 3-2, the graphene oxide has a too small the size, and contributes few to the improvement of electrical conductivity, UV resistance and flame retardancy; and in Comparative Example 3, the size of graphene oxide is too large, it cannot be effectively unfolded into a flake-like graphene oxide after being added to a polymerization system, and can only be used as a pleated spherical filler to reinforce the composite material, causing the spinnability and continuity of the material to decrease significantly. When the size is in the range of 1-50 μm, as the size increases, graphene oxide can exert a more potent reinforcing effect.

It can be found through analysis of Comparative Example 3-1, Example 3-2, Example 3-4, and Comparative Example 3-4 that as the carbon/oxygen ratio increases, the performance of the fabric becomes better. This is because as the carbon/oxygen ratio increases, the graphene has fewer defects and better performances, which make the composite perform better. However, the carbon/oxygen ratio cannot be too high; otherwise the bonding between graphene oxide sheets is too strong, and the graphene oxide is still maintained stacked during polymerization, and clogs the spinneret, causing difficulty in continuous production (Comparative Example 3-4).

It can be found through analysis of Comparative Example 3-1, Comparative Example 3-5, Example 3-2, Example 3-5, Example 3-6, and Comparative Example 3-6 that the increase in the amount of graphene oxide increases the flame retardancy, and greatly improves the electrical conductivity and UV resistance of the fabric. At a dosage, the graphene cannot effectively form an electrically conductive network, making the performance of the fabric unable to meet the requirements of flame retardancy and antistatic performance (Comparative Example 3-5). After too much graphene oxide is added, graphene undergoes intense stacking during the reduction process to form an aggregate, which reduces the spinnability (Comparative Example 3-6). Therefore, the amount of graphene oxide needs to be controlled within a reasonable range.

Example 3-7

(1) A single-layer graphene oxide dispersion was dried by atomization drying at a temperature of 200° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 3.25 part by weight of the pleated graphene oxide microspheres obtained in Step (1) and 0.018 part by weight of antimony ethylene glycol were added to the esterification product obtained in Step (2), incubated with stirring for 3 hrs at a stirring speed of 140 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was spun, cooled, oiled, drawn, textured, woven, dyed, and finished to obtain a multi-functional graphene/polyester composite fabric. The spinning temperature is 270° C., the spinning speed is 5000 m/min, and the draw ratio is 4. The obtained fiber has a Denier number of 30D. The weaving method is to weave using a loom without a shuttle.

After the above steps, a multi-functional graphene/polyester composite fabric having good performances is obtained.

Example 3-8

(1) A single-layer graphene oxide dispersion was dried by atomization drying at a temperature of 130° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 3.25 part by weight of the pleated graphene oxide microspheres obtained in Step (1) and 0.018 part by weight of antimony ethylene glycol were added to the esterification product obtained in Step (2), incubated with stirring for 1 hrs at a stirring speed of 200 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 10 parts by weight of an anti-oxidant, spun, cooled, oiled, drawn, textured, woven, dyed, and finished to obtain a multi-functional graphene/polyester composite fabric. The spinning temperature is 290° C., the spinning speed is 3000 m/min, and the draw ratio is 1.5. The obtained fiber has a Denier number of 600D. The weaving method is to weave using a loom without a shuttle.

After the above steps, a multi-functional graphene/polyester composite fabric having good performances is obtained.

Example 4-1

(1) A single-layer graphene oxide dispersion was dried by atomization drying at a temperature of 130° C. to obtain graphene oxide microspheres, where the graphene oxide sheet has a size of 1-3 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and casted into a film, to obtain a graphene/PET composite film. The temperature for extruding is 260° C., the rotational speed of the screw is 100 rpm, and the drawing velocity is 8 m/min.

Figure 5:
FIG. 5 is a photograph of a graphene/PET composite film prepared in the present invention.

After the above steps, a graphene/PET composite film is obtained, as shown in FIG. 5. Specific properties of the composite film are shown in Tables 5 and 6.

Example 4-2

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite film. The temperature for extruding is 260° C., the rotational speed of the screw is 100 rpm, and the drawing velocity is 8 m/min.

After the above steps, a graphene/PET composite film is obtained. Specific properties are shown in Tables 5 and 6.

Example 4-3

(1) A single-layer graphene oxide dispersion was dried by atomization drying at a temperature of 130° C. to obtain graphene oxide microspheres, where the graphene oxide sheet has a size of 40-45 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite film. The temperature for extruding is 260° C., the rotational speed of the screw is 100 rpm, and the drawing velocity is 8 m/min.

After the above steps, a graphene/PET composite film is obtained. Specific properties are shown in Tables 5 and 6.

Example 4-4

(1) A single-layer graphene oxide dispersion was dried by atomization drying at a temperature of 160° C. to obtain graphene oxide microspheres, where the graphene oxide sheet has a size of 10-15 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.4 part by weight of an anti-oxidant, melted and extruded, to obtain a graphene/PET composite film. The temperature for extruding is 260° C., the rotational speed of the screw is 100 rpm, and the drawing velocity is 8 m/min.

After the above steps, a graphene/PET composite film is obtained. Specific properties are shown in Tables 5 and 6.

Example 4-5

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 1.17 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.3 part by weight of an anti-oxidant, melted and extruded, to obtain a graphene/PET composite film. The temperature for extruding is 260° C., the rotational speed of the screw is 100 rpm, and the drawing velocity is 8 m/min.

After the above steps, a graphene/PET composite film is obtained. Specific properties are shown in Tables 5 and 6.

Example 4-6

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 5.85 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET composite material.

(4) 100 parts by weight of the graphene/PET nanocomposite material was uniformly mixed with 0.5 part by weight of an anti-oxidant, melted and extruded, to obtain a graphene/PET composite film. The temperature for extruding is 260° C., the rotational speed of the screw is 100 rpm, and the drawing velocity is 8 m/min.

After the above steps, a graphene/PET composite film is obtained. Specific properties are shown in Tables 5 and 6.

Comparative Example 4-1

PET was prepared following the method as described in Example 1, except that no pleated graphene oxide microspheres were added during the preparation process. The performances are shown in Tables 5 and 6.

Comparative Example 4-2

(1) A single-layer graphene oxide dispersion was dried by atomization drying at a temperature of 130° C. to obtain graphene oxide microspheres, where the graphene oxide sheet has a size of 0.3-0.7 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite film. The temperature for extruding is 260° C., the rotational speed of the screw is 100 rpm, and the drawing velocity is 8 m/min.

After the above steps, a graphene/PET composite film is obtained. Specific properties are shown in Tables 5 and 6.

Comparative Example 4-3

(1) A single-layer graphene oxide dispersion was dried by atomization drying at a temperature of 130° C. to obtain graphene oxide microspheres, where the graphene oxide sheet has a size of 70-80 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite film. The temperature for extruding is 260° C., the rotational speed of the screw is 100 rpm, and the drawing velocity is 8 m/min.

After the above steps, a graphene/PET composite film is obtained. Specific properties are shown in Tables 5 and 6.

Comparative Example 4-4

(1) A single-layer graphene oxide dispersion was dried by atomization drying at a temperature of 220° C. to obtain graphene oxide microspheres, where the graphene oxide sheet has a size of 10-15 μm, and the carbon/oxygen ratio is 10.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite film. The temperature for extruding is 260° C., the rotational speed of the screw is 100 rpm, and the drawing velocity is 8 m/min.

After the above steps, a graphene/PET composite film is obtained. Specific properties are shown in Tables 5 and 6.

Comparative Example 4-5

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 9.36 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET composite material.

(4) 100 parts by weight of the graphene/PET nanocomposite material was uniformly mixed with 0.2 part by weight of an anti-oxidant, melted and extruded, to obtain a graphene/PET composite film. The temperature for extruding is 260° C., the rotational speed of the screw is 100 rpm, and the drawing velocity is 8 m/min.

After the above steps, a graphene/PET composite film is obtained. Rupture tends to occur during the film formation, the uniformity of the film is poor, and small holes appear on the surface of the film. Specific properties are shown in Tables 5 and 6. The oxygen and water permeability are determined according to GB/T 19789-2005. The UV protection performance is measured according to GB/T 18830-2009. The conductivity is measured with a high-resistance meter.

TABLE 5

| | Specific parameters of the examples | | |
|---|---|---|---|
| | Carbon/oxygen ratio in graphene oxide | Size of graphene oxide (μm) | Amount of graphene oxide (wt %) |
| Example 4-1 | 2.5 | 1-3 | 0.1 |
| Example 4-2 | 2.5 | 10-15 | 0.1 |
| Example 4-3 | 2.5 | 40-45 | 0.1 |
| Example 4-4 | 5 | 10-15 | 0.1 |
| Example 4-5 | 2.5 | 10-15 | 1 |
| Example 4-6 | 2.5 | 10-15 | 5 |
| Comparative Example 4-1 | — | — | — |

TABLE 5-continued

Specific parameters of the examples

|  | Carbon/oxygen ratio in graphene oxide | Size of graphene oxide (μm) | Amount of graphene oxide (wt %) |
|---|---|---|---|
| Comparative Example 4-2 | 2.5 | 0.3-0.7 | 0.1 |
| Comparative Example 4-3 | 2.5 | 70-80 | 0.1 |
| Comparative Example 4-4 | 10 | 10-15 | 0.1 |
| Comparative Example 4-5 | 2.5 | 10-15 | 8 |

TABLE 6

Specific properties of the examples

|  | Film thickness (μm) | UV protection factor (UPF) | Oxygen permeability (cm$^3$ m$^2$ day, 0.1 MPa) | Vapor permeability (g m$^2$ day, 0.1 MPa) | Electrical conductivity (S/m) |
|---|---|---|---|---|---|
| Example 4-1 | 45 | 30.2 | 0.169 | 0.142 | $10^{-16}$ |
| Example 4-2 | 45 | 32.6 | 0.157 | 0.133 | $10^{-16}$ |
| Example 4-3 | 45 | 35.7 | 0.138 | 0.114 | $10^{-16}$ |
| Example 4-4 | 45 | 41.9 | 0.126 | 0.097 |  |
| Example 4-5 | 45 | 65.6 | 0.087 | 0.065 | $10^{-7}$ |
| Example 4-6 | 45 | 97.3 | 0.045 | 0.026 | $10^{-3}$ |
| Comparative Example 4-1 | 45 | 7.5 | 3.054 | 2.351 | $10^{-16}$ |
| Comparative Example 4-2 | 45 | 18.1 | 2.986 | 2.274 | $10^{-16}$ |
| Comparative Example 4-3 | 45 | 31.1 | 2.69 | 2.113 |  |
| Comparative Example 4-4 | 45 | 36.4 | 2.378 | 2.041 | $10^{-16}$ |
| Comparative Example 4-5 | 45 | 174.6 | — | — | $10^{-2}$ |

It can be found through analysis of Comparative Example 4-1, Comparative Example 4-2, Example 4-1, Example 4-2, Example 4-3, and Comparative Example 4-3 that while the carbon/oxygen ratio in graphene oxide and the amount of graphene oxide added are kept unchanged, the selection of graphene oxide with a size in a suitable range results in a composite material with the optimum performances. In Comparative Example 4-2, the size of graphene oxide is too small, and the reinforcing effect is not obvious; and in Comparative Example 4-3, the size of graphene oxide is too large, it cannot be effectively unfolded into a flake-like graphene oxide after being added to a polymerization system, can only be used as a pleated spherical filler to reinforce the composite material, and contributes few to the UV protection and barrier performance. When the size is in the range of 1-50 μm, as the size increases, graphene oxide can exert a more potent reinforcing effect.

It can be found through analysis of Comparative Example 4-1, Example 4-2, Example 4-4, and Comparative Example 4-4 that as the carbon/oxygen ratio increases, the performance of the composite material becomes better. This is because as the carbon/oxygen ratio increases, the graphene has fewer defects and better performances, which makes the barrier performance of the composite material better. However, the carbon/oxygen ratio cannot be too high; otherwise the bonding between graphene oxide sheets is too strong, and the graphene oxide cannot be unfolded during polymerization to exist in the composite film as flake-like graphene, so it has no the effects of blocking water and oxygen and protecting against UV, and even seriously affects the continuity of film formation (Comparative Example 4-4).

It can be found through analysis of Comparative Example 4-1, Example 4-2, Example 4-5, Example 4-6, and Comparative Example 4-5 that the increase in the amount of graphene oxide increases the barrier performance and greatly improves the UV resistance and electrical conductivity of the composite film. After too much graphene oxide is added, although the electrical conductivity can be further improved, due to the stacking of graphene, the film solvent is broken during the casting process, and the uniformity of the film is greatly reduced, resulting in some micropores, making it difficult to achieve a barrier effect (Comparative Example 4-5).

Example 4-7

(1) A single-layer graphene oxide dispersion was dried by atomization drying at a temperature of 200° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.0117 part by weight of the pleated graphene oxide microspheres obtained in Step (1) and 0.018 part by weight of antimony ethylene glycol were added to the esterification product obtained in Step (2), incubated with stirring for 1 hrs at a stirring speed of 200 rpm, heated to 285° C. and evacuated to allow the reaction to proceed until no heat was released from the system, and then granulated with water cooling to obtain a graphene/PET composite material.

(4) 100 parts by weight of the graphene/PET nanocomposite material was melted and extruded, to obtain a graphene/PET composite film. The temperature for extruding is 250° C., the rotational speed of the screw is 40 rpm, and the drawing velocity is 1 m/min.

After the above steps, a graphene/PET composite film having good performances is obtained.

Example 4-8

(1) A single-layer graphene oxide dispersion was dried by atomization drying at a temperature of 200° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.0117 part by weight of the pleated graphene oxide microspheres obtained in Step (1) and 0.018 part by weight of antimony ethylene glycol were added to the esterification product obtained in Step (2), incubated with stirring for 3 hrs at a stirring speed of 140 rpm, heated to 285° C. and evacuated to allow the reaction to proceed until no heat was released from the system, and then granulated with water cooling to obtain a graphene/PET composite material.

(4) 100 parts by weight of the graphene/PET nanocomposite material was melted and extruded, to obtain a graphene/PET composite film. The temperature for extruding is 280° C., the rotational speed of the screw is 300 rpm, and the drawing velocity is 50 m/min.

After the above steps, a graphene/PET composite film having good performances is obtained.

Example 5-1

(1) A single-layer graphene oxide dispersion was dried by atomization drying at a temperature of 130° C. to obtain graphene oxide microspheres, where the graphene oxide sheet has a size of 1-3 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties of the composite board are shown in Tables 7 and 8.

Example 5-2

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties are shown in Tables 7 and 8.

Example 5-3

(1) A single-layer graphene oxide dispersion was dried by atomization drying at a temperature of 130° C. to obtain graphene oxide microspheres, where the graphene oxide sheet has a size of 40-45 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties are shown in Tables 7 and 8.

Example 5-4

(1) A single-layer graphene oxide dispersion was dried by atomization drying at a temperature of 160° C. to obtain graphene oxide microspheres, where the graphene oxide sheet has a size of 10-15 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.4 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties are shown in Tables 7 and 8.

Example 5-5

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 1.17 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.3 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties are shown in Tables 7 and 8.

Example 5-6

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 5.85 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET composite board.

(4) 100 parts by weight of the graphene/PET nanocomposite material was uniformly mixed with 0.5 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties are shown in Tables 7 and 8.

Comparative Example 5-1

PET was prepared following the method as described in Example 1, except that no pleated graphene oxide microspheres were added during the preparation process. The performances are shown in Tables 7 and 8.

Comparative Example 5-2

(1) A single-layer graphene oxide dispersion was dried by atomization drying at a temperature of 130° C. to obtain graphene oxide microspheres, where the graphene oxide sheet has a size of 0.3-0.7 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties are shown in Tables 7 and 8.

Comparative Example 5-3

(1) A single-layer graphene oxide dispersion was dried by atomization drying at a temperature of 130° C. to obtain graphene oxide microspheres, where the graphene oxide sheet has a size of 70-80 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties are shown in Tables 7 and 8.

Comparative Example 5-4

(1) A single-layer graphene oxide dispersion was dried by atomization drying at a temperature of 220° C. to obtain graphene oxide microspheres, where the graphene oxide sheet has a size of 10-15 μm, and the carbon/oxygen ratio is 10.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties are shown in Tables 7 and 8.

Comparative Example 5-5

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 9.36 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET composite board.

(4) 100 parts by weight of the graphene/PET nanocomposite material was uniformly mixed with 0.2 part by weight of an anti-oxidant, melted and extruded, to obtain a graphene/PET composite board. The temperature for extruding is 240° C., the rotational speed of the screw is 70 rpm, and the drawing velocity is 4 m/min.

After the above steps, a graphene/PET composite board is obtained. Specific properties are shown in Tables 7 and 8. The heat distortion temperature is measured according to GB/T 1634.1-2004. The tensile yield strength and modulus are measured according to GB/T 1040.1-2006. The flame retardancy is tested according to UL94 horizontal and vertical burning test method.

TABLE 7

Specific parameters of the examples

| | Carbon/oxygen ratio in graphene oxide | Size of graphene oxide (μm) | Amount of graphene oxide (wt %) |
|---|---|---|---|
| Example 5-1 | 2.5 | 1-3 | 0.1 |
| Example 5-2 | 2.5 | 10-15 | 0.1 |
| Example 5-3 | 2.5 | 40-45 | 0.1 |
| Example 5-4 | 5 | 10-15 | 0.1 |
| Example 5-5 | 2.5 | 10-15 | 1 |
| Example 5-6 | 2.5 | 10-15 | 5 |
| Comparative Example 5-1 | — | — | — |
| Comparative Example 5-2 | 2.5 | 0.3-0.7 | 0.1 |
| Comparative Example 5-3 | 2.5 | 70-80 | 0.1 |
| Comparative Example 5-4 | 10 | 10-15 | 0.1 |
| Comparative Example 5-5 | 2.5 | 10-15 | 8 |

TABLE 8

Specific properties of the examples

| | Yield strength (MPa) | Tensile modulus (GPa) | Elongation at break (%) | Yield strength at 80° C. (MPa) | Dripping rate (s/drop) | Electrical conductivity (S/m) |
|---|---|---|---|---|---|---|
| Example 5-1 | 63.1 | 2.61 | 82 | 32.2 | 6.89 | $10^{-16}$ |
| Example 5-2 | 65.8 | 2.66 | 81 | 33.6 | 7.04 | $10^{-16}$ |
| Example 5-3 | 69.6 | 2.8 | 80 | 35.8 | 10.39 | $10^{-16}$ |
| Example 5-4 | 70.3 | 2.84 | 77 | 36.4 | 11.87 | $10^{-16}$ |
| Example 5-5 | 75.6 | 2.91 | 70 | 39.6 | 17.95 | $10^{-7}$ |
| Example 5-6 | 74.4 | 2.98 | 65 | 39.3 | 22.68 | $10^{-3}$ |
| Comparative Example 5-1 | 52.3 | 2.3.1 | 75 | 27.4 | 3.68 | $10^{-16}$ |
| Comparative Example 5-2 | 54.7 | 2.37 | 79 | 27.9 | 4.98 | $10^{-16}$ |
| Comparative Example 5-3 | 55.2 | 2.53 | 70 | 28.3 | 5.62 | $10^{-16}$ |
| Comparative Example 5-4 | 57.8 | 2.38 | 55 | 29.1 | 5.83 | $10^{-16}$ |
| Comparative Example 5-5 | 61.1 | 2.59 | 36 | 30.1 | 8.46 | $10^{-2}$ |

It can be found through analysis of Comparative Example 5-1, Comparative Example 5-2, Example 5-1, Example 5-2, Example 5-3, and Comparative Example 5-3 that while the carbon/oxygen ratio in graphene oxide and the amount of graphene oxide added are kept unchanged, the selection of graphene oxide with a size in a suitable range results in a composite material with the optimum performances. In Comparative Example 5-2, the size of graphene oxide is too small, so the graphene oxide cannot be an effective reinforcing material itself; and in Comparative Example 5-3, the size of graphene oxide is too large, it cannot be effectively unfolded into a flake-like graphene oxide after being added to a polymerization system, and can only be used as a pleated spherical filler to reinforce the composite material, resulting in a small increase in the tensile strength and modulus and a slightly decrease in the elongation at break. When the size is in the range of 1-50 μm, as the size increases, graphene oxide can exert a more potent reinforcing effect.

It can be found through analysis of Comparative Example 5-1, Example 5-2, Example 5-4, and Comparative Example 5-4 that as the carbon/oxygen ratio increases, the performance of the composite material becomes better. This is because as the carbon/oxygen ratio increases, the graphene has fewer defects and better performances, which make the composite perform better. However, the carbon/oxygen ratio cannot be too high; otherwise the bonding between graphene oxide sheets is too strong, and the graphene oxide cannot be unfolded during polymerization, so it cannot be effectively enhance, or even greatly reduce the elongation at break (Comparative Example 5-4).

It can be found through analysis of Comparative Example 5-1, Example 5-2, Example 5-5, Example 5-6, and Comparative Example 5-5 that the increase in the amount of graphene oxide increases the mechanical properties, significantly reduces the dripping rate and greatly improves the electrical conductivity of the material. After too much graphene oxide is added, although the flame retardancy and electrical conductivity is further improved, the mechanical properties of the material are reduced. This is due to the stacking of excessive graphene, which reduces the reinforcing effect and makes the material brittle (Comparative Example 5-5).

Example 5-7

(1) A single-layer graphene oxide dispersion was dried by atomization drying at a temperature of 200° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.0117 part by weight of the pleated graphene oxide microspheres obtained in Step (1) and 0.018 part by weight of antimony ethylene glycol were added to the esterification product obtained in Step (2), incubated with stirring for 1 hrs at a stirring speed of 200 rpm, heated to 285° C. and evacuated to allow the reaction to proceed until no heat was released from the system, and then granulated with water cooling to obtain a graphene/PET composite film.

(4) 100 parts by weight of the graphene/PET nanocomposite material was uniformly mixed with 10 parts by weight of an anti-oxidant, melted and extruded, to obtain a graphene/PET composite board. The temperature for extruding is 230° C., the rotational speed of the screw is 30 rpm, and the drawing velocity is 0.15 m/min.

After the above steps, a graphene/PET composite board having good performances is obtained.

Example 5-8

(1) A single-layer graphene oxide dispersion was dried by atomization drying at a temperature of 130° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.0117 part by weight of the pleated graphene oxide microspheres obtained in Step (1) and 0.018 part by weight of antimony ethylene glycol were added to the esterification product obtained in Step (2), incubated with stirring for 3 hrs at a stirring speed of 140 rpm, heated to 285° C. and evacuated to allow the reaction to proceed until no heat was released from the system, and then granulated with water cooling to obtain a graphene/PET composite film.

(4) 100 parts by weight of the graphene/PET nanocomposite material was uniformly mixed with 10 parts by weight of an anti-oxidant, melted and extruded, to obtain a graphene/PET composite board. The temperature for extruding is 260° C., the rotational speed of the screw is 90 rpm, and the drawing velocity is 6 m/min.

After the above steps, a graphene/PET composite board having good performances is obtained.

Example 6-4

(1) A single-layer graphene oxide dispersion was dried by atomization drying at a temperature of 130° C. to obtain graphene oxide microspheres, where the graphene oxide sheet has a size of 1-3 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.234 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

(5) 55 parts of cotton fibers, 40 parts of graphene/PET composite fibers and 15 parts of spandex fiber were blended to obtain a graphene-modified polyester blended fabric.

Figure 6:
FIG. 6 is a photograph of a graphene-modified polyester blended fabric.

After the above steps, a graphene-modified polyester blended fabric is obtained, as shown in FIG. 6.

Example 6-2

(1) A single-layer graphene oxide dispersion was dried by atomization drying at a temperature of 130° C. to obtain graphene oxide microspheres, where the graphene oxide sheet has a size of 10-15 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.234 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.4 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

(5) 55 parts of cotton fibers, 40 parts of graphene/PET composite fibers and 15 parts of spandex fiber were blended to obtain a graphene-modified polyester blended fabric.

After the above steps, a graphene-modified polyester blended fabric is obtained. Specific properties are shown in Table 9.

Example 6-3

(1) A single-layer graphene oxide dispersion was dried by atomization drying at a temperature of 130° C. to obtain graphene oxide microspheres, where the graphene oxide sheet has a size of 40-45 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.234 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.3 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

(5) 55 parts of cotton fibers, 40 parts of graphene/PET composite fibers and 15 parts of spandex fiber were blended to obtain a graphene-modified polyester blended fabric.

After the above steps, a graphene-modified polyester blended fabric is obtained. Specific properties are shown in Table 9.

Example 6-4

(1) A single-layer graphene oxide dispersion was dried by atomization drying at a temperature of 160° C. to obtain graphene oxide microspheres, where the graphene oxide sheet has a size of 10-15 µm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.234 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C., and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.6 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

(5) 55 parts of cotton fibers, 40 parts of graphene/PET composite fibers and 15 parts of spandex fiber were blended to obtain a graphene-modified polyester blended fabric.

After the above steps, a graphene-modified polyester blended fabric is obtained, Specific properties are shown in Table 9.

Example 6-5

(1) A single-layer graphene oxide dispersion was dried by atomization drying at a temperature of 130° C. to obtain graphene oxide microspheres, where the graphene oxide sheet has a size of 10-15 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 1.17 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.8 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

(5) 55 parts of cotton fibers, 40 parts of graphene/PET composite fibers and 15 parts of spandex fiber were blended to obtain a graphene-modified polyester blended fabric.

After the above steps, a graphene-modified polyester blended fabric is obtained. Specific properties are shown in Table 9.

Example 6-6

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 5.85 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.5 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

(5) 55 parts of cotton fibers, 40 parts of graphene/PET composite fibers and 15 parts of spandex fiber were blended to obtain a graphene-modified polyester blended fabric.

After the above steps, a graphene-modified polyester blended fabric is obtained. Specific properties are shown in Table 9.

Comparative Example 6-1

PET was prepared following the method as described in Example 1, except that no pleated graphene oxide microspheres were added during the preparation process. The performances are shown in Table 9.

Comparative Example 6-2

(1) A single-layer graphene oxide dispersion was dried by atomization drying at a temperature of 130° C. to obtain graphene oxide microspheres, where the graphene oxide sheet has a size of 0.3-0.7 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.234 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

(5) 55 parts of cotton fibers, 40 parts of graphene/PET composite fibers and 15 parts of spandex fiber were blended to obtain a graphene-modified polyester blended fabric.

After the above steps, a graphene/polyester composite fabric is obtained. Specific properties are shown in Table 9.

Comparative Example 6-3

(1) A single-layer graphene oxide dispersion was dried by atomization drying at a temperature of 130° C. to obtain graphene oxide microspheres, where the graphene oxide sheet has a size of 70-80 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.234 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

After the above steps, it is found that the spinneret is clogged, the continuity of the spun yarn is less good, and the frequency of yarn breakage is high.

Comparative Example 6-4

(1) A single-layer graphene oxide dispersion was dried by atomization drying at a temperature of 220° C. to obtain graphene oxide microspheres, where the graphene oxide sheet has a size of 10-15 μm, and the carbon/oxygen ratio is 10.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.234 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

After the above steps, it is found that the spinneret is clogged, the continuity of the spun yarn is less good, and the frequency of yarn breakage is high.

Comparative Example 6-5

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.0585 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.5 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

(5) 55 parts of cotton fibers, 40 parts of graphene/PET composite fibers and 15 parts of spandex fiber were blended to obtain a graphene-modified polyester blended fabric.

After the above steps, a graphene/polyester composite fabric is obtained. Specific properties are shown in Table 9.

Comparative Example 6-6

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 9.36 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.5 part by weight of an anti-oxidant, spun, cooled, oiled, drawn, and textured, to obtain a graphene/PET composite fiber. The spinning temperature was 280° C., the spinning speed was 3600 m/min, the draw ratio was 1.5, and the denier number was 100D.

After the above steps, it is found that the spinneret is clogged, the continuity of the spun yarn is less good, and the frequency of yarn breakage is high.

TABLE 9

Specific parameters and properties of the example

| | Carbon/oxygen ratio in graphene oxide | Size of graphene oxide (μm) | Amount of graphene oxide (wt %) | Flame spread upon burning in 45° direction/length of damage (cm) | UV protection factor (UPF) of fabric |
|---|---|---|---|---|---|
| Example 6-1 | 2.5 | 1-3 | 0.2 | N/6.9 | 63.2 |
| Example 6-2 | 2.5 | 10-15 | 0.2 | N/6.4 | 66.2 |
| Example 6-3 | 2.5 | 40-45 | 0.2 | N/5.8 | 70.6 |
| Example 6-4 | 5 | 10-15 | 0.2 | N/5.5 | 72.1 |
| Example 6-5 | 2.5 | 10-15 | 1 | N/3.6 | 89.3 |
| Example 6-6 | 2.5 | 10-15 | 5 | N/2.2 | 114.6 |
| Comparative Example 6-1 | — | — | — | Y/12.7 | 2.8 |
| Comparative Example 6-2 | 2.5 | 0.3-0.7 | 0.2 | N/8.5 | 19.2 |
| Comparative Example 6-3 | 2.5 | 70-80 | 0.2 | — | — |
| Comparative Example 6-4 | 10 | 10-15 | 0.2 | — | — |
| Comparative Example 6-5 | 2.5 | 10-15 | 0.05 | N/10.2 | 10.1 |
| Comparative Example 6-6 | 2.5 | 10-15 | 8 | — | — |

The flame retardancy is tested by the burning rate in a 45° direction. The UV protection factor (UPF) is obtained by measuring with a UV spectrophotometer and calculating.

It can be found through analysis of Comparative Example 6-1, Comparative Example 6-2, Example 6-1 Example 6-2, Example 6-3, and Comparative Example 3 that while the carbon/oxygen ratio in graphene oxide and the amount of graphene oxide added are kept unchanged, the selection of graphene oxide with a size in a suitable range results in a blended fabric with the optimum performances. In Comparative Example 6-2, the graphene oxide has a too small the size, and contributes few to the improvement of electrical conductivity, UV resistance and flame retardancy; and in Comparative Example 6-3, the size of graphene oxide is too large, it cannot be effectively unfolded into a flake-like graphene oxide after being added to a polymerization system, and can only be used as a pleated spherical filler to reinforce the composite material, causing the spinnability and continuity of the material to decrease significantly. When the size is in the range of 1-50 μm, as the size increases, graphene oxide can exert a more potent reinforcing effect.

It can be found through analysis of Comparative Example 6-1, Example 6-2, Example 6-4, and Comparative Example 6-4 that as the carbon/oxygen ratio increases, the performance of the fabric becomes better. This is because as the carbon/oxygen ratio increases, the graphene has fewer defects and better performances, which make the composite perform better. However, the carbon/oxygen ratio cannot be too high; otherwise the bonding between graphene oxide sheets is too strong, and the graphene oxide is still maintained stacked during polymerization, and clogs the spinneret, causing difficulty in continuous production (Comparative Example 6-4).

It can be found through analysis of Comparative Example 6-1, Comparative Example 6-5, Example 6-2, Example 6-5, Example 6-6, and Comparative Example 6-6 that the increase in the amount of graphene oxide increases the flame retardancy, and greatly improves the UV resistance of the fabric. At a low dosage, graphene does not work effectively graphene (Comparative Example 6-5). However, where the dosage is too high, graphene is reduced and undergoes intense stacking during polymerization to form an aggregate, which reduces the spinnability (Comparative Example 6-6). Therefore, the amount of graphene oxide needs to be controlled within a reasonable range.

In summary, by controlling the amount of the pleated graphene oxide microspheres, the carbon/oxygen ratio, and the size of graphene oxide within a reasonable range, a blended fabric with excellent UV resistance and flame retardancy can be obtained.

Example 6-7

(1) A single-layer graphene oxide dispersion was dried by atomization drying at a temperature of 200° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 3 hrs at a stirring speed of 140 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 10 parts by weight of an anti-oxidant, spun, cooled, oiled, drawn, and textured, to obtain a graphene/PET composite fiber. The spinning temperature was 270° C., the spinning speed was 3000 m/min, the draw ratio was 1.5, and the denier number was 400D.

(5) 40 parts of cotton fibers, 30 parts of graphene/PET composite fibers and 10 parts of spandex fiber were blended to obtain a graphene-modified polyester blended fabric.

After the above steps, a graphene-modified polyester blended fabric with good performance is obtained.

Example 6-8

(1) A single-layer graphene oxide dispersion was dried by atomization drying at a temperature of 130° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 5.85 part by weight of the pleated graphene oxide microspheres obtained in Step (1) and 0.018 part by weight of antimony ethylene glycol were added to the esterification product obtained in Step (2), incubated with stirring for 1 hrs at a stirring speed of 200 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was spun, cooled, oiled, drawn, and textured, to obtain a graphene/PET composite fiber. The spinning temperature was 285° C., the spinning speed was 3600 m/min, the draw ratio was 4, and the denier number was 30D.

(5) 60 parts of cotton fibers, 50 parts of graphene/PET composite fibers and 20 parts of spandex fiber were blended to obtain a graphene-modified polyester blended fabric.

After the above steps, a graphene-modified polyester blended fabric with good performance is obtained.

Example 7-1

(1) A single-layer graphene oxide dispersion was dried by atomization drying at a temperature of 130° C. to obtain graphene oxide microspheres, where the graphene oxide sheet has a size of 1-3 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, a graphene-modified flame-retardant UV-resistant polyester fiber is obtained. Specific properties are shown in Tables 10 and 11.

Example 7-2

(1) A single-layer graphene oxide dispersion was dried by atomization drying at a temperature of 130° C. to obtain graphene oxide microspheres, where the graphene oxide sheet has a size of 10-15 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, a graphene-modified flame-retardant UV-resistant polyester fiber is obtained. Specific properties are shown in Tables 10 and 11.

Example 7-3

(1) A single-layer graphene oxide dispersion was dried by atomization drying at a temperature of 130° C. to obtain graphene oxide microspheres, where the graphene oxide sheet has a size of 40-45 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, a graphene-modified flame-retardant UV-resistant polyester fiber is obtained. Specific properties are shown in Tables 10 and 11.

Example 7-4

(1) A single-layer graphene oxide dispersion was dried by atomization drying at a temperature of 160° C. to obtain graphene oxide microspheres, where the graphene oxide sheet has a size of 10-15 µm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.4 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, a graphene-modified flame-retardant UV-resistant polyester fiber is obtained. Specific properties are shown in Tables 10 and 11.

Example 7-5

(1) A single-layer graphene oxide dispersion was dried by atomization drying at a temperature of 130° C. to obtain graphene oxide microspheres, where the graphene oxide sheet has a size of 10-15 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 1.17 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.3 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, a graphene-modified flame-retardant UV-resistant polyester fiber is obtained. Specific properties are shown in Tables 10 and 11.

Example 7-6

(1) A single-layer graphene oxide dispersion was dried by atomization drying at a temperature of 130° C. to obtain graphene oxide microspheres, where the graphene oxide sheet has a size of 10-15 µm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 5.85 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET composite board.

(4) 100 parts by weight of the graphene/PET nanocomposite material was uniformly mixed with 0.5 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, a graphene-modified flame-retardant UV-resistant polyester fiber is obtained. Specific properties are shown in Tables 10 and 11.

Comparative Example 7-1

PET was prepared following the method as described in Example 1, except that no pleated graphene oxide microspheres were added during the preparation process. The performances are shown in Tables 10 and 11.

Comparative Example 7-2

(1) A single-layer graphene oxide dispersion was dried by atomization drying at a temperature of 130° C. to obtain graphene oxide microspheres, where the graphene oxide sheet has a size of 0.3-0.7 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.3 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, a graphene-modified flame-retardant UV resistant polyester fiber is obtained. Specific properties are shown in Tables 10 and 11.

Comparative Example 7-3

(1) A single-layer graphene oxide dispersion was dried by atomization drying at a temperature of 130° C. to obtain graphene oxide microspheres, where the graphene oxide sheet has a size of 70-80 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, it is found that the spinneret is clogged, the continuity of the spun yarn is less good, and the frequency of yarn breakage is high.

Comparative Example 7-4

(1) A single-layer graphene oxide dispersion was dried by atomization drying at a temperature of 220° C. to obtain graphene oxide microspheres, where the graphene oxide sheet has a size of 10-15 μm, and the carbon/oxygen ratio is 10.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.117 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 0.2 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, it is found that the spinneret is clogged, the continuity of the spun yarn is less good, and the frequency of yarn breakage is high.

Comparative Example 7-5

(1) A single-layer graphene oxide dispersion was dried by atomization drying at a temperature of 130° C. to obtain graphene oxide microspheres, where the graphene oxide sheet has a size of 10-15 μm, and the carbon/oxygen ratio is 2.5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 9.36 part by weight of the pleated graphene oxide microspheres obtained in Step (1) and 0.018 part by weight of antimony ethylene glycol were added to the esterification product obtained in Step (2), incubated with stirring for 2 hrs at a stirring speed of 160 rpm, heated to 285° C. and evacuated to allow the reaction to proceed until no heat was released from the system, and then granulated with water cooling to obtain a graphene/PET composite board.

(4) 100 parts by weight of the graphene/PET nanocomposite material was uniformly mixed with 0.2 part by weight of an anti-oxidant, spun, cooled, oiled, drawn, and wound, to obtain a graphene-modified flame-retardant UV-resistant polyester fiber. The temperature for extruding is 280° C., and the winding speed is 3600 m/min.

After the above steps, it is found that the spinneret is clogged, the continuity of the spun yarn is less good, and the frequency of yarn breakage is high.

TABLE 10

Specific parameters of the examples

|  | Carbon/oxygen ratio in graphene oxide | Size of graphene oxide (μm) | Amount of graphene oxide (wt %) |
|---|---|---|---|
| Example 7-1 | 2.5 | 1-3 | 0.1 |
| Example 7-2 | 2.5 | 10-15 | 0.1 |
| Example 7-3 | 2.5 | 40-45 | 0.1 |
| Example 7-4 | 5 | 10-15 | 0.1 |
| Example 7-5 | 2.5 | 10-15 | 1 |
| Example 7-6 | 2.5 | 10-15 | 5 |
| Comparative Example 7-1 | — | — | — |
| Comparative Example 7-2 | 2.5 | 0.3-0.7 | 0.1 |
| Comparative Example 7-3 | 2.5 | 70-80 | 0.1 |
| Comparative Example 7-4 | 10 | 10-15 | 0.1 |
| Comparative Example 7-5 | 2.5 | 10-15 | 8 |

TABLE 11

Specific properties of the examples

|  | Flame spread upon burning in 45° direction/length of damage (cm) | Breaking strength (cN/dtex) | UV protection factor (UPF) of fabric |
|---|---|---|---|
| Example 7-1 | N/5.7 | 3.61 | 34.4 |
| Example 7-2 | N/5.2 | 3.89 | 38.6 |
| Example 7-3 | N/4.8 | 4.08 | 45.2 |
| Example 7-4 | N/4.5 | 4.34 | 47.4 |
| Example 7-5 | N/3.9 | 4.67 | 143.4 |
| Example 7-6 | N/3.3 | 4.98 | 162.8 |
| Comparative Example 7-1 | Y/10.2 | 3.12 | 6.3 |
| Comparative Example 7-2 | N/7.2 | 3.38 | 21.3 |
| Comparative Example 7-3 | — | — | — |
| Comparative Example 7-4 | — | — | — |
| Comparative Example 7-5 | — | — | — |

It can be found through analysis of Comparative Example 7-1, Comparative Example 7-2, Example 7-1, Example 7-2, Example 7-3, and Comparative Example 7-3 that while the carbon/oxygen ratio in graphene oxide and the amount of graphene oxide added are kept unchanged, the selection of graphene oxide with a size in a suitable range results in a composite fiber with the optimum performances. In Comparative Example 7-2, the size of graphene oxide is too small, so the graphene oxide cannot be an effective reinforcing material itself; and in Comparative Example 3, the size of graphene oxide is too large, it cannot be effectively unfolded into a flake-like graphene oxide after being added to a polymerization system, and can only be used as a pleated spherical filler to reinforce the composite material, causing the spinnability and continuity of the material to decrease significantly. When the size is in the range of 1-50 μm, as the size increases, graphene oxide can exert a more potent reinforcing effect.

It can be found through analysis of Comparative Example 7-1, Example 7-2, Example 7-4, and Comparative Example 7-4 that as the carbon/oxygen ratio increases, the performance of the composite fiber becomes better. This is because as the carbon/oxygen ratio increases, the graphene has fewer defects and better performances, which makes the composite perform better. However, the carbon/oxygen ratio cannot be too high; otherwise the bonding between graphene oxide sheets is too strong, and the graphene oxide is still maintained stacked during polymerization, and clogs the spinneret, causing difficulty in continuous production (Comparative Example 7-4).

It can be found through analysis of Comparative Example 7-1, Example 7-2, Example 7-5, Example 7-6, and Comparative Example 7-5 that the increase in the amount of graphene oxide allows the mechanical properties, UV resistance and flame retardancy of the composite fiber to increase significantly. After too much graphene oxide is added, graphene undergoes intense stacking during the reduction process to form an aggregate, which reduces the spinnability (Comparative Example 7-5).

Example 7-7

(1) A single-layer graphene oxide dispersion was dried by atomization drying at a temperature of 200° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.0117 part by weight of the pleated graphene oxide microspheres obtained in Step (1) and 0.018 part by weight of antimony ethylene glycol were added to the esterification product obtained in Step (2), incubated with stirring for 1 hrs at a stirring speed of 200 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was uniformly mixed with 10 parts by weight of an anti-oxidant, spun, cooled, oiled, drawn, and wound, to obtain a graphene-modified flame-retardant UV-resistant polyester fiber. The temperature for extruding is 280° C., and the winding speed is 3000 m/min.

After the above steps, a graphene-modified flame-retardant UV-resistant polyester fiber with good performance is obtained.

Example 7-8

(1) A single-layer graphene oxide dispersion was dried by atomization drying at a temperature of 200° C. to obtain graphene oxide microspheres, where the graphene oxide sheet has a size of 20-30 μm, and the carbon/oxygen ratio is 5.

(2) 100 parts by weight of terephthalic acid, 53 parts by weight of ethylene glycol, and 0.02 part by weight of sodium acetate were fully mixed by stirring, and subjected to an esterification reaction at 250° C. until no water was produced.

(3) 0.0117 part by weight of the pleated graphene oxide microspheres obtained in Step (1) and 0.018 part by weight of antimony ethylene glycol were added to the esterification product obtained in Step (2), incubated with stirring for 3 hrs at a stirring speed of 140 rpm, heated to 285° C. and evacuated to allow the reaction to proceed until no heat was released from the system, and then granulated with water cooling to obtain a graphene/PET nanocomposite material.

(4) 100 parts by weight of the graphene/PET nanocomposite material was spun, cooled, oiled, drawn, and wound, to obtain a graphene-modified flame-retardant UV-resistant polyester fiber. The temperature for extruding is 285° C., and the winding speed is 4800 m/min.

After the above steps, a graphene-modified flame-retardant UV-resistant polyester fiber with good performance is obtained.

Example 8-1

(1) A single-layer graphene oxide dispersion was dried by atomization drying at a temperature of 180° C. to obtain graphene oxide microspheres, where the graphene oxide sheet has a size of 40-50 μm, and the carbon/oxygen ratio is 5.

(2) 100 parts by weight of terephthalic acid, 72 parts by weight of butanediol, and 0.02 part by weight of tetrabutyl titanate were fully mixed by stirring, and subjected to an esterification reaction at 235° C. until no water is produced.

(3) 8 parts by weight of the pleated graphene oxide microspheres obtained in Step (1) and 0.02 part by weight of tetrabutyl titanate were added to the esterification product obtained in Step (2), incubated with stirring for 3 hrs, heated to 255° C. and evacuated to allow the reaction to proceed until no heat is released from the system, and then granulated with water cooling to obtain a graphene/PBT nanocomposite material.

Figure 7:
FIG. 7 is a photograph of a graphene/polyester nanocomposite material prepared in the present invention.

After the above steps, a graphene/PBT nanocomposite material is obtained, as shown in FIG. 7.

In addition, through a large number of comparative tests, it is found that the size of graphene oxide (1-50 μm), carbon/oxygen ratio (2.5-5), atomization drying temperature (130-200° C.), and proportion of graphene oxide in the whole system are all requisite conditions for obtaining a graphene/PBT composite material with uniform dispersion and excellent performance. Compared with neat PBT, the tensile strength is increased by more than 5%, and the modulus is increased by more than 10%, the resistivity is $10^7$-$10^3$Ω m, and the UV protection factor (UPF) is greater than 40 after being spun and woven into a fabric. This example shows only a further preferred result. The tensile strength and modulus are 25% and 45% higher than those of neat PBT, the resistivity is $10^3$Ω m, and the UV protection factor (UPF) is greater than 130 after being spun and woven into a fabric.

Example 8-2

(1) A single-layer graphene oxide dispersion was dried by atomization drying at a temperature of 140° C. to obtain graphene oxide microspheres, where the graphene oxide sheet has a size of 40-50 μm, and the carbon/oxygen ratio is 3.

(2) 100 parts by weight of terephthalic acid, 63 parts by weight of propanediol, and 0.02 part by weight of tetrabutyl titanate were fully mixed by stirring, and subjected to an esterification reaction at 240° C. until no water is produced.

(3) 8 parts by weight of the pleated graphene oxide microspheres obtained in Step (1) and 0.02 part by weight of tetraisobutyl titanate were added to the esterification product obtained in Step (2), incubated with stirring for 3 hrs, heated to 260° C. and evacuated to allow the reaction to proceed until no heat is released from the system, and then granulated with water cooling to obtain a graphene/PBT nanocomposite material.

After the above steps, a graphene/PTT nanocomposite material is obtained.

In addition, through a large number of comparative tests, it is found that the size of graphene oxide (1-50 μm), carbon/oxygen ratio (2.5-5), atomization drying temperature (130-200° C.), and proportion of graphene oxide in the whole system are all requisite conditions for obtaining a graphene/PTT composite material with uniform dispersion and excellent performance. Compared with neat PTT, the tensile strength is increased by more than 5%, and the modulus is increased by more than 8%, the resistivity is $10^1$-$10^3$Ω m, and the UV protection factor (UPF) is greater than 40 after being spun and woven into a fabric. This example shows only a further preferred result. The tensile strength and modulus are 20% and 50% higher than those of neat PET, the resistivity is $10^3$Ω m, and the UV protection factor (UPF) is greater than 140 after being spun and woven into a fabric.

Example 8-3

(1) A single-layer graphene oxide dispersion was dried by atomization drying at a temperature of 180° C. to obtain graphene oxide microspheres, where the graphene oxide sheet has a size of 40-50 μm, and the carbon/oxygen ratio is 5.

(2) 100 parts by weight of terephthalic acid, 132 parts by weight of 1,4-cyclohexanedimethanol, and 0.01 part by weight of tetrabutyl titanate were fully mixed by stirring, and subjected to an esterification reaction at 220° C. until no water is produced.

(3) 7 parts by weight of the pleated graphene oxide microspheres obtained in Step (1) and 0.03 part by weight of tetrabutyl titanate were added to the esterification product obtained in Step (2), incubated with stirring for 3 hrs, heated to 290° C. and evacuated to allow the reaction to proceed until no heat is released from the system, and then granulated with water cooling to obtain a graphene/PCT nanocomposite material.

After the above steps, a graphene/PCT nanocomposite material is obtained.

In addition, through a large number of comparative tests, it is found that the size of graphene oxide (1-50 μm), carbon/oxygen ratio (2.5-5), atomization drying temperature (130-200° C.), and proportion of graphene oxide in the whole system are all requisite conditions for obtaining a graphene/PCT composite material with uniform dispersion and excellent performance. Compared with neat PCT, the tensile strength is increased by more than 5%, and the modulus is increased by more than 10%, the resistivity is $10^7$-$10^3$Ω m, and the UV protection factor (UPF) is greater than 40 after being spun and woven into a fabric. This example shows only a further preferred result. The tensile strength and modulus are 18% and 39% higher than those of neat PCT, the resistivity is $10^3\Omega$ m, and the UV protection factor (UPF) is greater than 145 after being spun and woven into a fabric.

Example 8-4

(1) A single-layer graphene oxide dispersion was dried by atomization drying at a temperature of 180° C. to obtain graphene oxide microspheres, where the graphene oxide sheet has a size of 40-50 µm, and the carbon/oxygen ratio is 5.

(2) 100 parts by weight of terephthalic acid, 40 parts by weight of butanediol, 36 parts by weight of propanediol, and 0.02 part by weight of tetrabutyl titanate were fully mixed by stirring, and subjected to an esterification reaction at 240° C. until no water is produced.

(3) 8 parts by weight of the pleated graphene oxide microspheres obtained in Step (1) and 0.03 part by weight of tetrabutyl titanate were added to the esterification product obtained in Step (2), incubated with stirring for 3 hrs, heated to 260° C. and evacuated to allow the reaction to proceed until no heat is released from the system, and then granulated with water cooling to obtain a graphene/PBT nanocomposite material.

After the above steps, a graphene/PBT/PTT nanocomposite material is obtained.

In addition, through a large number of comparative tests, it is found that the size of graphene oxide (1-50 µm), carbon/oxygen ratio (2.5-5), atomization drying temperature (130-200° C.), and proportion of graphene oxide in the whole system are all requisite conditions for obtaining a graphene/PBT/PTT composite material with uniform dispersion and excellent performance. Compared with/PBT/PTT without graphene, the tensile strength is increased by more than 8%, and the modulus is increased by more than 12%, the resistivity is $10^7$-$10^3\Omega$ m, and the UV protection factor (UPF) is greater than 30 after being spun and woven into a fabric. This example shows only a further preferred result. The tensile strength and modulus are 27% and 50% higher than those of neat PBT, the resistivity is $10^3\Omega$ m, and the UV protection factor (UPF) is greater than 130 after being spun and woven into a fabric.

Example 8-5

(1) A single-layer graphene oxide dispersion was dried by atomization drying at a temperature of 130° C. to obtain graphene oxide microspheres, where the graphene oxide sheet has a size of 1-5 µm, and the carbon/oxygen ratio is 2.5.

(2) 100 parts by weight of terephthalic acid, 125 parts by weight of 1,4-cyclohexanedimethanol, and 0.02 part by weight of tetrabutyl titanate were fully mixed by stirring, and subjected to an esterification reaction at 220° C. until no water is produced.

(3) 0.5 parts by weight of the pleated graphene oxide microspheres obtained in Step (1) and 0.1 part by weight of tetrabutyl titanate were added to the esterification product obtained in Step (2), incubated with stirring for 3 hrs, heated to 290° C. and evacuated to allow the reaction to proceed until no heat is released from the system, and then granulated with water cooling to obtain a graphene/PCT nanocomposite material.

After the above steps, a graphene/PCT nanocomposite material is obtained. The tensile strength and modulus are 10% and 15% higher than those of neat PCT, the resistivity is $10^6\Omega$ m, and the UV protection factor (UPF) is greater than 50 after being spun and woven into a fabric.

Example 8-6

(1) A single-layer graphene oxide dispersion was dried by atomization drying at a temperature of 200° C. to obtain graphene oxide microspheres, where the graphene oxide sheet has a size of 40-50 µm, and the carbon/oxygen ratio is 5.

(2) 100 parts by weight of terephthalic acid, 76 parts by weight of butanediol, and 0.03 part by weight of tetrabutyl titanate were fully mixed by stirring, and subjected to an esterification reaction at 235° C. until no water is produced.

(3) 0.1 parts by weight of the pleated graphene oxide microspheres obtained in Step (1) and 0.05 part by weight of tetrabutyl titanate were added to the esterification product obtained in Step (2), incubated with stirring for 3 hrs, heated to 2.55° C. and evacuated to allow the reaction to proceed until no heat is released from the system, and then granulated with water cooling to obtain a graphene/PBT nanocomposite material.

After the above steps, a graphene/PBT nanocomposite material is obtained. The tensile strength and modulus are 15% and 25% higher than those of neat PBT, the resistivity is $10^7\Omega$ m, and the UV protection factor (UPF) is greater than 40 after being spun and woven into a fabric.

Example 9-1

(1) A single-layer graphene oxide dispersion was dried by atomization drying at a temperature of 130° C. to obtain pleated graphene oxide microspheres, where the graphene oxide sheet has a size of 0.3-5 µm and 1 µm on average, the carbon/oxygen ratio is 5, and the moisture content is less than 0.1%.

(2) 3.5 parts by weight of pleated graphene oxide microspheres and 2 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

This material was spun at a high speed, to obtain a yarn roll. Due to the higher amount of graphene added, the yarn has a high UV resistance and a very low percolation threshold.

The properties of the obtained graphene/nylon 6 nanocomposite material are shown in Table 12.

Example 9-2

(1) A single-layer graphene oxide dispersion was dried by atomization drying at a temperature of 130° C. to obtain pleated graphene oxide microspheres, where the graphene oxide sheet has a size of 1-20 µm and 10 µm on average, the carbon/oxygen ratio is 4.2, and the moisture content is less than 0.1%.

(2) 2 parts by weight of pleated graphene oxide microspheres and 2 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 12.

Example 9-3

(1) A single-layer graphene oxide dispersion was dried by atomization drying at a temperature of 130° C. to obtain pleated graphene oxide microspheres, where the graphene oxide sheet has a size of 1-40 μm and 20 μm on average, the carbon/oxygen ratio is 3.9, and the moisture content is less than 0.1%.

(2) 0.5 parts by weight of pleated graphene oxide microspheres and 2 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 12.

Example 9-4

(1) A single-layer graphene oxide dispersion was dried by atomization drying at a temperature of 150° C. to obtain pleated graphene oxide microspheres, where the graphene oxide sheet has a size of 20-50 μm and 40 μm on average, the carbon/oxygen ratio is 3, and the moisture content is less than 0.1%.

(2) 0.2 parts by weight of pleated graphene oxide microspheres and 1.5 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 12.

Example 9-5

(1) A single-layer graphene oxide dispersion was dried by atomization drying at a temperature of 160° C. to obtain pleated graphene oxide microspheres, where the graphene oxide sheet has an average size of 50 μm, the carbon/oxygen ratio is 2.5, and the moisture content is less than 0.1%.

(2) 0.01 parts by weight of pleated graphene oxide microspheres and 1 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 12.

Example 9-6

(1) A single-layer graphene oxide dispersion was dried by atomization drying at a temperature of 130° C. to obtain pleated graphene oxide microspheres, where the graphene oxide sheet has a size of 1-20 μm and 15 μm on average, the carbon/oxygen ratio is 3.9, and the moisture content is less than 0.1%.

(2) 0.005 parts by weight of pleated graphene oxide microspheres and 1 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 13.

Example 9-7

(1) A single-layer graphene oxide dispersion was dried by atomization drying at a temperature of 130° C. to obtain pleated graphene oxide microspheres, where the graphene oxide sheet has a size of 1-20 μm and 15 μm on average, the carbon/oxygen ratio is 3.9, and the moisture content is less than 0.1%.

(2) 4 parts by weight of pleated graphene oxide microspheres and 3 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 13.

Example 9-8

(1) A single-layer graphene oxide dispersion was dried by atomization drying at a temperature of 130° C. to obtain pleated graphene oxide microspheres, where the graphene oxide sheet has a size of 0.1-0.8 μm and 0.5 μm on average, the carbon/oxygen ratio is 3.9, and the moisture content is less than 0.1%.

(2) 0.2 parts by weight of pleated graphene oxide microspheres and 1 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 13.

Example 9-9

(1) A single-layer graphene oxide dispersion was dried by atomization drying at a temperature of 130° C. to obtain pleated graphene oxide microspheres, where the graphene oxide sheet has a size of 80-120 μm and 100 μm on average, the carbon/oxygen ratio is 3.9, and the moisture content is less than 0.1%.

(2) 0.2 parts by weight of pleated graphene oxide microspheres and 2 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 13.

Example 9-10

(1) A single-layer graphene oxide dispersion was dried by atomization drying at a temperature of 130° C. to obtain pleated graphene oxide microspheres, where the graphene oxide sheet has a size of 0.1-0.8 μm and 15 μm on average, the carbon/oxygen ratio is 1.7, and the moisture content is less than 0.1%.

(2) 0.2 parts by weight of pleated graphene oxide microspheres and 2 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 13.

Example 9-11

(1) A single-layer graphene oxide dispersion was dried by atomization drying at a temperature of 130° C. to obtain pleated graphene oxide microspheres, where the graphene oxide sheet has a size of 0.1-0.8 μm and 15 μm on average, the carbon/oxygen ratio is 6.5, and the moisture content is less than 0.1%.

(2) 0.2 parts by weight of pleated graphene oxide microspheres and 2 parts by weight of deionized water were added to 100 parts by weight of caprolactam melt, and fully stirred at 80° C. at a high speed (400 rpm) to form a dispersion.

(3) under a nitrogen atmosphere, the dispersion was added to a polycondenzation reactor, heated to 250-270° C., and reacted under 0.5-1 MPa for 3 hrs and then under vacuum for 4 hrs to obtain a polymer melt; and finally, the polymer melt was granulated with water cooling to obtain a graphene/nylon 6 nanocomposite material.

The properties of the obtained graphene/nylon 6 nanocomposite material are shown in Table 13.

In order to systematically explain the improvement on comprehensive performances of the graphene/nylon 6 nanocomposite materials obtained in the present invention over neat nylon 6 materials, the mechanical properties, high temperature resistance, and anti-UV aging resistance of the composite materials obtained in the Examples 9-1-9-5 are listed in Table 12 for comparison. Table 13 compares the performance of the graphene/nylon 6 nanocomposite materials (Examples 9-6-9-11) obtained with the graphene going beyond the technical parameters of the graphene described in the present invention with the composite material (Example 9-3) obtained with a better composition.

TABLE 12

|  |  | Nylon 6 | Example 9-1 | Example 9-2 | Example 9-3 | Example 9-4 | Example 9-5 |
|---|---|---|---|---|---|---|---|
| Graphene | Content (%) 0.01-3.5 | 0 | 3.5 | 2 | 0.5 | 0.2 | 0.01 |
|  | Average transverse dimension (um) | / | 1 | 10 | 20 | 40 | 50 |
|  | Carbon/oxygen ratio 2.5-5 | / | 5 | 4.2 | 3.9 | 3 | 2.5 |
| Tensile yield strength at 23° C. (MPa) |  | 67.8 | 75.6 | 77.6 | 80.5 | 79.2 | 70.2 |
| Elastic modulus at 23° C. (GPa) |  | 2.48 | 3.33 | 3.29 | 2.99 | 3.05 | 2.82 |
| Elongation at break (%) |  | 230 | 150 | 180 | 200 | 220 | 175 |
| Bending strength (MPa) |  | 94.1 | 107.6 | 105.7 | 105.2 | 104.5 | 97.2 |
| Bending modulus (GPa) |  | 2.36 | 2.73 | 2.62 | 2.63 | 2.62 | 2.43 |
| Impact strength (KJ/m$^3$) |  | 8.6 | 6.4 | 7.1 | 8.9 | 8.0 | 8.8 |
| Heat distortion temperature (° C.) under 0.46 MPa |  | 67 | 114 | 104 | 117 | 113 | 70 |
| Yield strength (MPa) after four-week UV aging |  | 43.6 | 69.9 | 67.8 | 68.5 | 68.6 | 64.7 |

TABLE 12-continued

|  | Nylon 6 | Example 9-1 | Example 9-2 | Example 9-3 | Example 9-4 | Example 9-5 |
|---|---|---|---|---|---|---|
| UV protection factor (UPF) of fabric | 3 | 156 | 129 | 98 | 79 | 41 |
| Far infrared emissivity of fabric | 0.80 | 0.94 | 0.94 | 0.94 | 0.94 | 0.90 |
| Surface resistance | $10^{14}$ | $10^{5}$ | $10^{6}$ | $10^{7}$ | $10^{12}$ | $10^{14}$ |
| High-speed spinnability | Yes | Yes | Yes | Yes | Yes | Yes |

TABLE 13

|  |  | Example 9-3 | Example 9-6 | Example 9-7 | Example 9-8 | Example 9-9 | Example 9-10 | Example 9-11 |
|---|---|---|---|---|---|---|---|---|
| Graphene | Content(%) 0.01-3.5 | 0.5 | 0.005 | 4 | 0.2 | 0.2 | 0.2 | 0.2 |
|  | Average transverse dimension (μm) 1-50 | 20 | 15 | 15 | 0.5 | 100 | 15 | 15 |
|  | Carbon/oxygen ratio 2.5-5 | 3.9 | 3.9 | 3.9 | 3.9 | 3.9 | 1.7 | 6.5 |
| Tensile yield strength at 23° C. (MPa) |  | 80.5 | 67.7 | 72.2 | 72.1 | 74.6 | 70.2 | 74.0 |
| Elastic modulus at 23° C. (GPa) |  | 2.99 | 2.55 | 3.51 | 2.80 | 2.96 | 2.83 | 2.92 |
| Elongation at break (%) |  | 200 | 255 | 51 | 230 | 190 | 185 | 105 |
| Bending strength (MPa) |  | 105.2 | 95.7 | 99.6 | 97.7 | 102.0 | 100.8 | 101.4 |
| Bending modulus (GPa) |  | 2.63 | 2.42 | 2.93 | 2.49 | 2.63 | 2.47 | 2.48 |
| Impact strength (KJ/m$^2$) |  | 8.9 | 8.6 | 5.2 | 8.1 | 8.2 | 8.5 | 7.8 |
| Heat distortion temperature under 0.46 MPa |  | 117° C. | 75° C. | 111° C. | 81° C. | 150° C. | 90° C. | 97° C. |
| Yield strength after four-week UV aging |  | 68.5 MPa | 47.8 MPa | 67.7 MPa | 51.6 MPa | 63.2 MPa | 59.3 MPa | 63.3 MPa |
| UV protection factor (UPF) of fabric |  | 98 | 26 | / | 39 | / | 66 | / |
| Far infrared emissivity of fabric |  | 0.94 | 0.80 | / | 0.81 | / | 0.83 | / |
| Surface resistance |  | $10^{7}$ | $10^{14}$ | / | $10^{13}$ | / | $10^{14}$ | / |
| High-speed spinnability |  | Yes | Yes | No | Yes | No | Yes | No |

Example 9-12

(1) A single-layer graphene oxide dispersion was dried by atomization drying at a temperature of 130° C. to obtain pleated graphene oxide microspheres, where the graphene oxide sheet has an average size of 5 μm, the carbon/oxygen ratio is 3.9, and the moisture content is less than 0.1%.

(2) 0.2 parts by weight of pleated graphene oxide microspheres and 2 parts by weight of deionized water were added to 100 parts by weight of caprolactam melt, and fully stirred at 80° C. at a high speed (400 rpm) to form a dispersion.

(3) The dispersion was continuously polymerized in a VK tube, where the polymerization temperature was 260° C., and the polymerization time was 20 hrs; and the polymer melt was granulated with water cooling to obtain a graphene/nylon 6 nanocomposite material.

The obtained graphene/nylon 6 nanocomposite material as good performances.

Example 9-13

(1) A single-layer graphene oxide dispersion was dried by atomization drying at a temperature of 130° C. to obtain pleated graphene oxide microspheres, where the graphene oxide sheet has an average size of 3 μm, the carbon/oxygen ratio is 2.5, and the moisture content is less than 0.1%.

(2) 1 part by weight of pleated graphene oxide microspheres and 2 parts by weight of deionized water were added to 100 parts by weight of caprolactam melt, and fully stirred at 80° C. at a high speed (400 rpm) to form a dispersion.

(3) The dispersion was continuously polymerized in a VK tube, where the polymerization temperature was 260° C., and the polymerization time was 20 hrs; and the polymer melt was granulated with water cooling to obtain a graphene/nylon 6 nanocomposite material.

The obtained graphene/nylon 6 nanocomposite material as good performances.

What is claimed is:

1. A method for preparing a graphene-polyester nanocomposite material, comprising the following steps:
   (1) drying a dispersion of single-layer graphene oxide with a size of 1-50 μm by atomization drying to obtain pleated graphene oxide microspheres having a carbon/oxygen ratio of 2.5-5;
   (2) fully mixing 100 parts by weight of terephthalic acid, 50-150 parts by weight of a diol, and 0.01-0.5 part by weight of a catalyst by stirring, and subjecting the mixture to an esterification reaction at 200-260° C. until no water is produced; and
   (3) adding 0.02-10 parts by weight of the pleated graphene oxide microspheres obtained in Step (1) and 0.01-1 part by weight of a catalyst to the esterification product obtained in Step (2), incubating with stirring for 1-3 hrs, heating to 240-310° C. and evacuating to allow the reaction to proceed until no heat is released from the system, and then granulating with water cooling to obtain a graphene-polyester nanocomposite material.

2. The method of claim 1, wherein the diol in Step (2) is butanediol in an amount of 60-76.8 parts by weight, propylene glycol in an amount of 50-70 parts by weight; or 1,4-cyclohexanedimethanol in an amount of 121.4-147.5 parts by weight.

3. The method of claim 1, wherein the catalyst in Step (2) is one or more of an oxide, an inorganic salt and an organic compound of sodium, titanium, lead, and tin.

4. The method of claim 1, wherein the catalyst in Step (3) is one or more of an oxide, an inorganic salt and an organic compound of antimony, titanium, lead, and tin.

5. A method for preparing a graphene-nylon 6 nanocomposite material, comprising the following steps:
   (1) drying a dispersion of single-layer graphene oxide with a size of 1-50 μm by atomization drying to obtain pleated graphene oxide microspheres having a carbon/oxygen ratio of 2.5-5;
   (2) adding 0.01-3.5 parts by weight of pleated graphene oxide microspheres and 1-3 parts by weight of deionized water to 100 parts by weight of caprolactam melt, and fully stirring at 80° C. at a high speed (300-500 rpm) to form a dispersion; and
   (3) preparing a graphene-nylon 6 nanocomposite material in a batch reactor or in a VK tube,
   where in the batch reactor:
   under a nitrogen atmosphere, the dispersion is added to the polycondenzation reactor, heated to 250-270° C., and reacted under 0.5-1 MPa for 2-4 hrs and then under vacuum for 4-6 hrs to obtain a polymer melt; and finally, the polymer melt is granulated with water cooling to obtain a graphene-nylon 6 nanocomposite material; and
   in the VK tube:
   the dispersion is continuously polymerized in the VK tube, where the polymerization temperature is 260° C., and the polymerization time is 20 hrs; and the polymer melt is granulated with water cooling to obtain a graphene-nylon 6 nanocomposite material.

6. The preparation method of claim 5, wherein the atomization drying temperature in Step (1) is 130-160° C.

* * * * *